(12) United States Patent
Kiyohara et al.

(10) Patent No.: US 7,723,871 B2
(45) Date of Patent: May 25, 2010

(54) HEATING POWER SUPPLY APPARATUS

(75) Inventors: Toyohiko Kiyohara, Minato-ku (JP);
Takayoshi Hashizume, Minato-ku (JP)

(73) Assignee: Toshiba Mitsubishi-Electric Industrial Systems Corporation, Tokyo (JP)

( * ) Notice: Subject to any disclaimer, the term of this patent is extended or adjusted under 35 U.S.C. 154(b) by 33 days.

(21) Appl. No.: 12/066,215

(22) PCT Filed: Mar. 20, 2006

(86) PCT No.: PCT/JP2006/305569

§ 371 (c)(1),
(2), (4) Date: Mar. 7, 2008

(87) PCT Pub. No.: WO2007/108096

PCT Pub. Date: Sep. 27, 2007

(65) Prior Publication Data

US 2009/0267414 A1    Oct. 29, 2009

(51) Int. Cl.
*H01H 83/13* (2006.01)
(52) U.S. Cl. ....................................... 307/127
(58) Field of Classification Search ................... 307/127
See application file for complete search history.

(56) References Cited

U.S. PATENT DOCUMENTS 4,818,836 A * 4/1989 Bebber et al. .......... 219/121.54

FOREIGN PATENT DOCUMENTS

| JP | 58-146435 A | 9/1983 |
| JP | 62-001017 A | 1/1987 |
| JP | 02-79189 U | 6/1990 |
| JP | 06-109370 A | 4/1994 |
| JP | 11-206145 A | 7/1999 |
| JP | 2001-054284 A | 2/2001 |

* cited by examiner

*Primary Examiner*—Robert L. Deberadinis
(74) *Attorney, Agent, or Firm*—Sughrue Mion, PLLC

(57) ABSTRACT

A plural number of bridge circuits, each having a rectifier circuit with positive half wave control electrodes and a rectifier circuit with negative half wave control electrodes, and each of the plural number of the bridge circuits is connected to one winding of a power supply transformer; the rectifier circuit with negative half wave control electrodes selected from the plurality of the bridge circuits is electrically conducted when a predetermined the rectifier circuit with positive half wave control electrodes of the plurality of the bridge circuits is electrically conducted; the rectifier circuits with positive half wave control electrodes and the rectifier circuits with negative half wave control electrodes are connected by a plurality of loads.

14 Claims, 18 Drawing Sheets

HEATING POWER SUPPLY APPARATUS

TECHNICAL FIELD

The present invention relates to a heating power supply apparatus which heats a plurality of loads, for example, relates to a heating power supply apparatus which heats a negative resistance load such as a polycrystalline semiconductor or the like.

BACKGROUND ART

FIG. 17 is a configuration diagram showing a known heating power supply apparatus according to a patent document 1. In the drawing, reference numeral 1 denotes a four-winding transformer; 2, 3, 4, and 5 denote thyristor rectifiers connected to secondary coils of the four-winding transformer 1; and 14, 15, 16, and 17 denote negative resistance loads connected to each of the thyristor rectifiers 2 to 5. Reference numerals 6, 7, 8, 9, 10, 11, 12, and 13 denote thyristor switches as semiconductor switches connected in circuits (lines), for connecting the thyristor rectifiers 2 to 5 to the negative resistance loads 14 to 17. The loads 14 to 17 have negative resistance characteristics; and therefore, a small current at high voltage is required at initial energization, and a large current at low voltage is required at final stage energization.

As shown in FIG. 17, the known heating power supply apparatus is provided with eight circuits of the thyristor switches for switching modes on the load sides of four circuits of the thyristor rectifiers which convert alternative current to direct current in order to realize an improvement in power factor with respect to the negative resistance loads and a reduction in installed capacity. In the process when the resistive load is reduced, energization is performed by switching conductive/nonconductive states of the thyristor rectifiers and the thyristor switches into three modes: in an initial stage, "individual energization to four loads"; next, "energization to two loads in series"; and in a final stage, "energization to four loads in series."

Particularly, as shown in FIG. 18, in a large current region at the final stage, energization is performed via the thyristor rectifier 2 and two thyristor switches 9 and 10, and the thyristor rectifier 4 and three thyristor switches 6, 9, and 13; and therefore, electric power loss of the thyristor switches is large. In addition, in the drawing, a dashed line represents a current direction; a black (painted out) thyristor of the thyristors represents an energized state, and a white (not painted) thyristor represents a de-energized state.

In the known heating power supply apparatus, the thyristor switches are provided on the output sides of the thyristor rectifiers to switch between series and parallel connection; and therefore, there is a problem that there causes an increase in electric power loss.

Patent document 1: Japanese Unexamined Patent Publication No. 62-1017

DISCLOSURE OF THE INVENTION

Problems to be Solved by the Invention

The present invention has been made to solve the problem as described above, and an object of the present invention is to obtain a heating power supply apparatus which reduces electric power loss.

Means For Solving Problem

A heating power supply apparatus of the present invention includes a plural number of bridge circuits, each having a rectifier circuit with positive half wave control electrodes and a rectifier circuit with negative half wave control electrodes, and each of the plural number of the bridge circuits being connected to one winding of a power supply transformer. The rectifier circuit with negative half wave control electrodes selected from the plurality of the bridge circuits is electrically conducted when a predetermined the rectifier circuit with positive half wave control electrodes of the plurality of the bridge circuits is electrically conducted; the rectifier circuits with positive half wave control electrodes and the rectifier circuits with negative half wave control electrodes are connected by a plurality of loads provided therebetween; and the loads selected from the plurality of the loads are fed by electric power of the power supply transformer.

In addition, a heating power supply apparatus of the present invention includes a bridge circuit having a first rectifier circuit with positive half wave control electrodes and a first rectifier circuit with negative half wave control electrodes, a bridge circuit having a second rectifier circuit with positive half wave control electrodes and a second rectifier circuit with negative half wave control electrodes, and a bridge circuit having a third rectifier circuit with positive half wave control electrodes and a third rectifier circuit with negative half wave control electrodes, each of the bridge circuits being connected to one winding of a power supply transformer. One selected from the first rectifier circuit with negative half wave control electrodes and the second rectifier circuit with negative half wave control electrodes is electrically conducted when the first rectifier circuit with positive half wave control electrodes is electrically conducted; one selected from the first rectifier circuit with negative half wave control electrodes and the second rectifier circuit with negative half wave control electrodes is electrically conducted when the second rectifier circuit with positive half wave control electrodes is electrically conducted; the rectifier circuits with positive half wave control electrodes and the rectifier circuits with negative half wave control electrodes are connected by a plurality of loads provided therebetween; the loads selected from the plurality of the loads are fed by electric power of the power supply transformer; and the third rectifier circuit with negative half wave control electrodes is electrically conducted when the third rectifier circuit with positive half wave control electrodes is electrically conducted, so that a power feeding direction with respect to the loads is controlled.

Furthermore, a heating power supply apparatus of the present invention includes a plural number of bridge circuits, each having a rectifier circuit with positive half wave control electrodes and a rectifier circuit with negative half wave control electrodes, and each of the plural number of the bridge circuits being connected to one winding of a first power supply transformer; and a plural number of bridge circuits, each having a rectifier circuit with positive half wave control electrodes and a rectifier circuit with negative half wave control electrodes, and each of the plural number of the bridge circuits being connected to one winding of a second power supply transformer. The rectifier circuit with negative half wave control electrodes selected from the plurality of the bridge circuits connected to the first power supply transformer is electrically conducted when a predetermined the rectifier circuit with positive half wave control electrodes of the plurality of the bridge circuits connected to the first power supply transformer is electrically conducted; the rectifier circuit with negative half wave control electrodes selected from the plurality of the bridge circuits connected to the second power supply transformer is electrically conducted when a predetermined the rectifier circuit with positive half wave control electrodes of the plurality of the bridge circuits connected to the second power supply transformer is electrically conducted; the rectifier circuits with positive half wave control electrodes and the rectifier circuits with negative half wave control electrodes are connected by a plurality of loads provided therebetween; and the plurality of the loads are fed by electric power of the power supply transformer by selecting the number of series connections of the plurality of the loads.

Further, a heating power supply apparatus of the present invention includes two sets of bridge circuits, each having a rectifier circuit with positive half wave control electrodes and a rectifier circuit with negative half wave control electrodes, and each of the two sets of the bridge circuits being connected to one winding of a first power supply transformer; and two sets of bridge circuits, each having a rectifier circuit with positive half wave control electrodes and a rectifier circuit with negative half wave control electrodes, and each of the two sets of the bridge circuits being connected to one winding of a second power supply transformer. One of the bridge circuits connected to the first power supply transformer and one of the bridge circuits connected to the second power supply transformer are connected in series; the other of the bridge circuits connected to the first power supply transformer and the other of the bridge circuits connected to the second power supply transformer are connected in parallel by connecting each other's ends of the rectifier circuits with positive half wave control electrodes; the rectifier circuit with negative half wave control electrodes selected from a plurality of the bridge circuits connected to the first power supply transformer is electrically conducted when a predetermined the rectifier circuit with positive half wave control electrodes of the plurality of the bridge circuits connected to the first power supply transformer is electrically conducted; the rectifier circuit with negative half wave control electrodes selected from a plurality of the bridge circuits connected to the second power supply transformer is electrically conducted when a predetermined the rectifier circuit with positive half wave control electrodes of the plurality of the bridge circuits connected to the second power supply transformer is electrically conducted; the rectifier circuits with positive half wave control electrodes and the rectifier circuits with negative half wave control electrodes are connected by a plurality of loads provided therebetween; and the plurality of the loads are fed by electric power of the power supply transformer by selecting parallel or series or both.

EFFECTS OF THE INVENTION

According to the heating power supply apparatus of the present invention, the electric power of the power supply transformer can be fed to the loads selected from the plurality of loads, switching of selection of the loads or selection of the number of series of the loads can be performed by conductive/nonconductive control of the selected rectifier circuits with positive and negative half wave control electrodes, and electric power loss can be reduced.

In addition, according to the heating power supply apparatus of the present invention, the electric power of the power supply transformer can be fed to the loads selected from the plurality of the loads, a power feeding direction with respect to the loads can be controlled by electrically conducting the third rectifier circuit with negative-half wave control electrodes when the third rectifier circuit with positive half wave control electrodes is electrically conducted, switching of selection of the loads or selection of the number of series of the loads can be performed by conductive/nonconductive control of the selected positive and negative rectifier circuits, and electric power loss can be reduced.

Furthermore, according to the heating power supply apparatus of the present invention, the electric power of the power supply transformer can be fed to the plurality of the loads by selecting the number of series connections of the plurality of the loads, switching of selection of the loads or selection of the number of series of the loads can be performed by conductive/nonconductive control of the selected positive and negative rectifier circuits, electric power loss can be reduced, and voltage and current to be applied to the loads can be changed.

Further, according to the heating power supply apparatus of the present invention, both the ones of the bridge circuits are connected in series, and both the others of the bridge circuits are connected in parallel; and therefore, the object can be achieved by a small number of bridge circuits, electric power of the power supply transformer can be fed to a plurality of loads by selecting parallel or series or both, switching of selection of the loads and selection of the number of series or parallel of the loads can be performed by conductive/nonconductive control of the selected positive and negative rectifier circuits, electric power loss can be reduced, and voltage and current to be applied to the loads can be changed.

BEST MODE FOR CARRYING OUT THE INVENTION

Embodiment 1

A heating power supply apparatus according to an embodiment 1 of the present invention will be described on the basis of FIG. 1. Reference numerals 21 and 22 denote two-winding power supply transformers whose primary coils are connected to alternative current three phase lines 23. A bridge circuit 26 having a three phase rectifier circuit with positive half wave control electrodes (abbreviated as positive rectifier circuit) 24 and a three phase rectifier circuit with negative half wave control electrodes (abbreviated as negative rectifier circuit) 25, and a bridge circuit 29 having a three phase positive rectifier circuit 27 and a three phase negative rectifier circuit 28 are connected to a secondary coil (secondary winding) of the power supply transformer 21, respectively. In addition, each of the three phase rectifier circuit with half wave control electrodes is configured by a thyristor rectifier with a control electrode, for example. Of course, it may be configured by connecting a plurality of thyristor rectifiers with control electrodes in parallel when capacity is short. The following respective embodiments are also the same.

Bridge circuits 30, 31, and 32 are connected to a secondary coil (secondary winding) of the power supply transformer 22, respectively. The bridge circuit 30 has a three phase positive rectifier circuit 33 and a three phase negative rectifier circuit 34. Similarly, the bridge circuit 31 has a three phase positive rectifier circuit 35 and a three phase negative rectifier circuit 36. The bridge circuit 32 has a three phase positive rectifier circuit 37 and a three phase negative rectifier circuit 38. The positive rectifier circuits 24, 27, 33, 35, and 37 and the negative rectifier circuits 25, 28, 34, 36, and 38 are performed by on/off (conductive/nonconductive) control and current control during conductive state by a current control circuit 39. In addition, arrow lines drawn from the current control circuit 39 are connected to arrow lines of the positive rectifier circuits and the negative rectifier circuits, respectively. Reference numerals 40 to 43 denote negative resistance loads (for example, polycrystalline semiconductor), which are connected to power supplies of the power supply transformers in a state of one in series (and four in parallel), two in series (and two in parallel), or four in series by switching modes to be described later.

Next, an operation will be described using FIG. 2, FIG. 3, and FIG. 4. In addition, in the same drawings, a dotted line represents a current direction; a black (painted out) thyristor rectifier of the thyristor rectifiers represents an energized state, and a white (not painted) thyristor rectifier represents a de-energized state. The current control circuit 39 is omitted.

The loads 40 to 43 have negative resistance characteristics; and therefore, a small current at high voltage is required at initial energization, and a large current at low voltage is required at final stage energization. Therefore, if the loads are connected in parallel at the initial energization, and the loads are connected in series at the final stage energization; the loads seen from the power supply sides of the power supply transformers 21 and 22 become substantially constant.

First, at the initial energization (initial mode), the positive rectifier circuits 24, 27, 33, and 35 and the negative rectifier circuits 25 and 34 are electrically conducted at the same time. A small current at high voltage is energized to the loads 40 to 43 in energized loops shown by dotted lines in FIG. 2. That is, the current returns from the positive rectifier circuit 24 being through the load 40 to the negative rectifier circuit 25. The current returns from the positive rectifier circuit 27 being through the load 41 to the negative rectifier circuit 25. Similarly, the current returns from the positive rectifier circuit 33 being through the load 43 to the negative rectifier circuit 34. The current returns from the positive rectifier circuit 35 being through the load 42 to the negative rectifier circuit 34. At this time, the loads 40 to 43 are connected one in series and four in parallel with respect to the power supply.

With a decrease in resistance due to growth of polycrystalline semiconductors of the loads 40 to 43, electrically-conducting positive and negative rectifier circuits are controlled by the current control circuit 39 to control current, and a current commensurate with the loads 40 to 43 is energized. Then, the energization is shifted to medium-term energization at a time when a power factor becomes a certain value. In the medium-term energization (medium-term mode), the positive rectifier circuits 27 and 35 and the negative rectifier circuits 28 and 36 are electrically conducted at the same time. A medium current at medium voltage is energized to the loads 40 to 43 in energized loops shown by dotted lines in FIG. 3. That is, the current returns from the positive rectifier circuit 27 being through a series body of the loads 42 and 43 to the negative rectifier circuit 28. The current returns from the positive rectifier circuit 35 being through a series body of the loads 41 and 40 to the negative rectifier circuit 36.

At this time, the loads 40 to 43 are connected two in series and two in parallel to the power supply. Therefore, direct current output voltage of the positive rectifier circuit and the negative rectifier circuit becomes two times as large as a voltage at the end of the initial energization, and the power factor is improved. Thus, with the decrease in resistance due to further growth of the polycrystalline semiconductors of the loads 40 to 43, electrically-conducting positive and negative rectifier circuits are controlled by the current control circuit 39 to control current, and a current commensurate with the loads 40 to 43 is energized, as in at the initial energization. Then, the direct current voltage lowers; and therefore, the power factor is degraded. Consequently, the energization is shifted to final stage energization at a time when the power factor becomes a certain value.

In the final stage energization (final stage mode), the positive rectifier circuits 24 and 37 and the negative rectifier circuits 28 and 38 are electrically conducted at the same time. A large current at low voltage is energized to the loads 40 to 43 in energized loops as shown by dotted lines in FIG. 4. That is, the current returns from the positive rectifier circuit 24 being through a series body of the loads 40 to 43 to the negative rectifier circuit 28. The current returns from the positive rectifier circuit 37 being through the series body of the loads 40 to 43 to the negative rectifier circuit 38. At this time, currents flowing in the same direction are controlled so as to be energized to the series body of the loads 40 to 43 from both positive and negative rectifier circuits. The loads 40 to 43 are connected four in series with respect to the power supply; and therefore, the direct current output voltage becomes two times as large as a voltage at the end of the medium-term energization, and the power factor is improved. In addition, the positive and negative rectifier circuits 24 and 28, and the positive and negative rectifier circuits 37 and 38 are performed in the parallel run; and therefore, a current two times as large as the current at the medium-term energization can be outputted.

As described above, the positive rectifier circuit and the negative rectifier circuit of the bridge circuit have the function of switching modes in addition to electric power conversion to direct current. The large current at low voltage is generated from the small current at high voltage via the medium current at medium voltage while making three stage energization modes, increasing the number of series connections of the loads, and improving the power factor in response to a decrease in resistance value due to energization heating of the negative resistance load; and the polycrystalline semiconductor can be thermally grown. In addition, switching of the energization modes is performed by selectively switching operation of the respective positive rectifier circuits and the respective negative rectifier circuits; and therefore, switching speed is fast, and there is not a case where the loads are cooled because the switching takes a long time.

Furthermore, the switching of the three stage energization modes is performed by selectively switching operation of the respective positive rectifier circuits and the respective negative rectifier circuits; therefore, the thyristor switches are not required in the supplying circuits from the rectifier circuits to the loads as in the known way; and thus, electric power loss can be reduced. Particularly, there is a profound effect in the heating power supply apparatus with respect to the polycrystalline semiconductor which is heated by energization for days. To explain the final stage as an example, the three phase bridge circuit has two elements in series in total by the thyristor rectifier with control electrodes of the positive rectifier circuit and the thyristor rectifier with control electrodes of the negative rectifier circuit; and therefore, electric power loss of the element becomes ½ as large as the known electric power loss. In addition, two sets of the two-winding transformers are used in the above description; however, it is possible to configure by one unit of a three-winding transformer by putting the transformers together. This is also the same in other embodiments.

The loads to be heated, having negative resistance characteristics are described as an example in the embodiment 1; however, the embodiment 1 can be also applied to switching of selection of loads having no negative resistance characteristics.

Therefore, a heating power supply apparatus of the present invention includes a plural number of bridge circuits 26 and 29, each having a rectifier circuit with positive half wave control electrodes 24 (27) and a rectifier circuit with negative half wave control electrodes 25 (28), and each of the plural number of the bridge circuits being connected to one winding of a power supply transformer 21. The rectifier circuit with negative half wave control electrodes 25 (28) selected from the plurality of the bridge circuits 26 and 29 is electrically conducted when a predetermined the rectifier circuit with positive half wave control electrodes 24 (27) of the plurality of the bridge circuits 26 and 29 is electrically conducted; the rectifier circuits with positive half wave control electrodes 24 and 27 and the rectifier circuits with negative half wave control electrodes 25 and 28 are connected by a plurality of loads 40, 41, 42, and 43 provided therebetween; and the loads selected from the plurality of loads 40, 41, 42, and 43 are fed by electric power of the power supply transformer 21. With this configuration, switching of selection of the loads or selection of the number of series of the loads can be performed by conductive/nonconductive control of the selected positive and negative rectifier circuits, and electric power loss can be reduced.

In addition, a heating power supply apparatus of the present invention includes a bridge circuit 26 having a first rectifier circuit with positive half wave control electrodes 24 and a first rectifier circuit with negative half wave control electrodes 25, and a bridge circuit 29 having a second rectifier circuit with positive half wave control electrodes 27 and a second rectifier circuit with negative half wave control electrodes 28, each of the bridge circuits being connected to one winding of a power supply transformer 21. One selected from the first rectifier circuit with negative half wave control electrodes 25 and the second rectifier circuit with negative half wave control electrodes 28 is electrically conducted when the first rectifier circuit with positive half wave control electrodes 24 is electrically conducted; one selected from the first rectifier circuit with negative half wave control electrodes 25 and the second rectifier circuit with negative half wave control electrodes 28 is electrically conducted when the second rectifier circuit with positive half wave control electrodes 27 is electrically conducted; the rectifier circuits with positive half wave control electrodes 24 and 27 and the rectifier circuits with negative half wave control electrodes 25 and 28 are connected by a plurality of loads 40, 41, 42, and 43 provided therebetween; and the loads selected from the plurality of loads 40, 41, 42, and 43 are fed by electric power of the power supply transformer 21. With this configuration, switching of selection of the loads or selection of the number of series of the loads can be performed by conductive/nonconductive control of the selected positive and negative rectifier circuits, and electric power loss can be reduced.

Furthermore, a heating power supply apparatus of the present invention includes a bridge circuit 30 having a first rectifier circuit with positive half wave control electrodes 33 and a first rectifier circuit with negative half wave control electrodes 34, a bridge circuit 31 having a second rectifier circuit with positive half wave control electrodes 35 and a second rectifier circuit with negative half wave control electrodes 36, and a bridge circuit 32 having a third rectifier circuit with positive half wave control electrodes 37 and a third rectifier circuit with negative half wave control electrodes 38, each of the bridge circuits being connected to one winding of a power supply transformer 22. One selected from the first rectifier circuit with negative half wave control electrodes 34 and the second rectifier circuit with negative half wave control electrodes 36 is electrically conducted when the first rectifier circuit with positive half wave control electrodes 33 is electrically conducted; one selected from the first rectifier circuit with negative half wave control electrodes 34 and the second rectifier circuit with negative half wave control electrodes 36 is electrically conducted when the second rectifier circuit with positive half wave control electrodes 35 is electrically conducted; the rectifier circuits with positive half wave control electrodes and the rectifier circuits with negative half wave control electrodes are connected by a plurality of loads 40, 41, 42, and 43 provided therebetween; the loads selected from the plurality of loads 40, 41, 42, and 43 are fed by electric power of the power supply transformer 22; and the third rectifier circuit with negative half wave control electrodes 38 is electrically conducted when the third rectifier circuit with positive half wave control electrodes 37 is electrically conducted, so that a power feeding direction with respect to the loads is controlled.

With this configuration, switching of selection of the loads or selection of the number of series of the loads can be performed by conductive/nonconductive control of the selected positive and negative rectifier circuits, and electric power loss can be reduced. Together with those effects, a power feeding direction with respect to the loads can be controlled by electrically conducting the third rectifier circuit with negative half wave control electrodes 38 when the third rectifier circuit with positive half wave control electrodes 37 is electrically conducted.

In addition, in the heating power supply apparatus of the present invention, the electric power of the power supply transformer can be fed by selecting parallel or series or both with respect to a plurality of the loads selected from the plurality of the loads 40, 41, 42, and 43. With this configuration, voltage and current to be applied to the loads can changed.

Furthermore, in the heating power supply apparatus of the present invention, the load is a negative resistance load, the number of series connections with respect to a plurality of the loads selected from the plurality of the loads is selected, and voltage of the power supply transformer is applied. With this configuration, a current of from a small current at high voltage to a large current at low voltage can be applied to the loads while switching energization modes, increasing the number of series connections of the loads, and improving the power factor in response to the decrease in resistance value due to the energization heating of the negative resistance load.

Further, a heating power supply apparatus of the present invention includes a plural number of bridge circuits 26 and 29, each having a rectifier circuit with positive half wave control electrodes and a rectifier circuit with negative half wave control electrodes, and each of the plural number of the bridge circuits being connected to one winding of a first power supply transformer 21; and a plural number of bridge circuits 30, 31, and 32, each having a rectifier circuit with positive half wave control electrodes and a rectifier circuit with negative half wave control electrodes, and each of the plural number of the bridge circuits being connected to one winding of a second power supply transformer 22. The rectifier circuit with negative half wave control electrodes selected from the plurality of the bridge circuits 26 and 29 connected to the first power supply transformer 21 is electrically conducted when a predetermined the rectifier circuit with positive half wave control electrodes of the plurality of the bridge circuits 26 and 29 connected to the first power supply transformer 21 is electrically conducted; the rectifier circuit with negative half wave control electrodes selected from the plurality of the bridge circuits 30, 31, and 32 connected to the second power supply transformer 22 is electrically conducted when a predetermined the rectifier circuit with positive half wave control electrodes of the plurality of the bridge circuits 30, 31, and 32 connected to the second power supply transformer 22 is electrically conducted; the rectifier circuits with positive half wave control electrodes and the rectifier circuits with negative half wave control electrodes are connected by a plurality of loads 40, 41, 42, and 43 provided therebetween; the plurality of the loads are fed by electric power of the power supply transformer by selecting the number of series connections of the plurality of the loads.

With this configuration, switching of selection of the loads and selection of the number of series of the loads can be performed by conductive/nonconductive control of the selected positive and negative rectifier circuits, electric power loss can be reduced, and voltage and current to be applied to the loads can be changed.

Embodiment 2

A heating power supply apparatus according to an embodiment 2 will be described on the basis of FIG. 5. In addition, the same reference numerals as those in the embodiment 1 are identical or equivalent portions, and their description in the embodiment 1 will be incorporated into this embodiment. The different points from the embodiment 1 will be mainly described. In the embodiment 2, as in the embodiment 1, there is shown an other example in which a load has negative resistance characteristics; and a large current at low voltage is generated from a small current at high voltage via a medium current at medium voltage while making three stage energization modes, increasing the number of series connections of the loads, and improving a power factor in response to a decrease in resistance value due to energization heating of the negative resistance load.

Reference numerals 51 and 52 denote two-winding power supply transformers whose primary coils are connected to alternative current three phase lines 23. A bridge circuit 55 having a three phase rectifier circuit with positive half wave control electrodes (abbreviated as positive rectifier circuit) 53 and a three phase rectifier circuit with negative half wave control electrodes (abbreviated as negative rectifier circuit) 54 is connected to a secondary coil (secondary winding) of a power supply transformer 51. Similarly, a bridge circuit 58 having a three phase positive rectifier circuit 56 and a three phase negative rectifier circuit 57 is connected to a secondary coil of a power supply transformer 52. The respective positive rectifier circuits 53 and 56 and the respective negative rectifier circuits 54 and 57 are performed by conductive/nonconductive control and current control during a conductive state by a current control circuit 39. Bridge circuits 26, 55, 58, and 30 are connected inversely in series. Loads 40 to 43 are connected to power supplies of the power supply transformers in a state of one in series (and four in parallel), two in series (and two in parallel), or four in series by switching the modes.

Next, an operation will be described using FIG. 6, FIG. 7, and FIG. 8. In the same drawings, the current control circuit 39 is omitted. First, at initial energization, the respective bridge circuits 26, 55, 58, and 30 connected inversely in series are electrically conducted. That is, positive rectifier circuits 24, 53, 56, and 33, and negative rectifier circuits 25, 54, 57, and 34 are electrically conducted at the same time. A small current at high voltage is energized to the respective loads 40 to 43 in energized loops as shown by dotted lines in FIG. 6. That is, the current returns from the positive rectifier circuit 24 being through the load 40 to the negative rectifier circuit 25. The current returns from the positive rectifier circuit 53 being through the load 41 to the negative rectifier circuit 54. Similarly, the current returns from the positive rectifier circuit 56 being through the load 42 to the negative rectifier circuit 57. The current returns from the positive rectifier circuit 33 being through the load 43 to the negative rectifier circuit 34. At this time, the loads 40 to 43 are connected one in series and four in parallel with respect to the power supply.

With a decrease in resistance due to growth of polycrystalline semiconductors of the loads 40 to 43, electrically-conducting positive and negative rectifier circuits are controlled by the current control circuit 39 to control current, and a current commensurate with the loads 40 to 43 is energized. Then, the energization is shifted to medium-term energization at a time when the power factor becomes a certain value. In the medium-term energization, the positive rectifier circuits 27 and 35 and the negative rectifier circuits 28 and 36 are electrically conducted at the same time, as in the embodiment 1. A medium current at medium voltage is energized to the loads 40 to 43 in energized loops shown by dotted lines in FIG. 7. That is, the current returns from the positive rectifier circuit 27 being through a series body of the loads 42 and 43 to the negative rectifier circuit 28. The current returns from the positive rectifier circuit 35 being through a series body of the loads 41 and 40 to the negative rectifier circuit 36.

At this time, the loads 40 to 43 are connected two in series and two in parallel with respect to the power supply. Therefore, direct current output voltage of the positive rectifier circuit and the negative rectifier circuit becomes two times as large as a voltage at the end of the initial energization, and the power factor is improved. Thus, with the decrease in resistance due to further growth of the polycrystalline semiconductors of the loads 40 to 43, electrically-conducting positive and negative rectifier circuits are controlled by the current control circuit 39 to control current, and a current commensurate with the loads 40 to 43 is energized, as in at the initial energization. Then, the direct current voltage lowers; and therefore, the power factor is degraded. Consequently, the energization is shifted to final stage energization at a time when the power factor becomes a certain value.

In the final stage energization, the positive rectifier circuits 24 and 37 and the negative rectifier circuits 28 and 38 are electrically conducted at the same time, as in the embodiment 1. A large current at low voltage is energized to the loads 40 to 43 in energized loops as shown by dotted lines in FIG. 8. That is, the current returns from the positive rectifier circuit 24 being through a series body of the loads 40 to 43 to the negative rectifier circuit 28. The current returns from the positive rectifier circuit 37 being through the series body of the loads 40 to 43 to the negative rectifier circuit 38. At this time, currents flowing in the same direction are controlled so as to be energized to the series body of the loads 40 to 43 from both positive and negative rectifier circuits. The loads 40 to 43 are connected four in series with respect to the power supply; and therefore, the direct current output voltage becomes two times as large as a voltage at the end of the medium-term energization, and the power factor is improved. In addition, the positive and negative rectifier circuits 24 and 28, and the positive and negative rectifier circuits 37 and 38 are performed in the parallel run; and therefore, a current two times as large as the current at the medium-term energization can be outputted.

In addition, when there is a variation in characteristics of the loads 40 to 43 at the initial energization, in the aforementioned embodiment 1, the respective rectifier circuits with positive half wave control electrodes 24, 27, 33, and 35, and the rectifier circuits with negative half wave control electrodes 25 and 34 are in asymmetry control, and even-order harmonic current flows out to the alternative current three phase lines 23. However, in the present embodiment 2, four bridge circuits 26, 55, 58, and 30 are provided for four loads 40, 41, 42, and 43 at the initial energization; and therefore, all of the circuits are in symmetry control, and it is possible to prevent the even-order harmonic current from flowing out to the alternative current three phase lines 23.

The switching of the three stage energization modes is performed by selectively switching operation of the respective positive rectifier circuits and the respective negative rectifier circuits; therefore, the thyristor switches are not required in the supplying circuits from the rectifier circuits to the loads as in the known way, and thus, electric power loss can be reduced. In addition, when there is also a variation in characteristics of the loads 40 to 43 at the initial energization, it is possible to prevent the even-order harmonic current from flowing out to the alternative current three phase lines 23. In addition, four sets of the two-winding transformers are used in the above description; however, it is possible to configure by one unit of a five-winding transformer, for example, by putting the transformers together. This is also the same in other embodiments. The loads to be heated, having negative resistance characteristics are described as an example in the embodiment 2; however, of course, the embodiment 2 can be also applied to switching of selection of loads having no negative resistance characteristics.

A heating power supply apparatus of the present invention includes a plural number of bridge circuits 26 and 29, each having a rectifier circuit with positive half wave control electrodes and a rectifier circuit with negative half wave control electrodes, and each of the plural number of the bridge circuits being connected to one winding of a first power supply transformer 21; a plural number of bridge circuits 30, 31, and 32, each having a rectifier circuit with positive half wave control electrodes and a rectifier circuit with negative half wave control electrodes, and each of the plural number of the bridge circuits being connected to one winding of a second power supply transformer 22; a bridge circuit 55 having a rectifier circuit with positive half wave control electrodes 53 and a rectifier circuit with negative half wave control electrodes 54, the bridge circuit being connected to a third power supply transformer 51; and a bridge circuit 58 having a rectifier circuit with positive half wave control electrodes 56 and a rectifier circuit with negative half wave control electrodes 57, the bridge circuit being connected to a fourth power supply transformer 52. The rectifier circuit with negative half wave control electrodes selected from the plurality of the bridge circuits 26 and 29 connected to the first power supply transformer 21 is electrically conducted when a predetermined the rectifier circuit with positive half wave control electrodes of the plurality of the bridge circuits 26 and 29 connected to the first power supply transformer 21 is electrically conducted; the rectifier circuit with negative half wave control electrodes selected from the plurality of the bridge circuits 30, 31, and 32 connected to the second power supply transformer 22 is electrically conducted when a predetermined the rectifier circuit with positive half wave control electrodes of the plurality of the bridge circuits 30, 31, and 32 connected to the second power supply transformer 22 is electrically conducted; the rectifier circuit with negative half wave control electrodes 54 connected to the third power supply transformer 51 is electrically conducted when the rectifier circuit with positive half wave control electrodes 53 connected to the third power supply transformer 51 is electrically conducted; the rectifier circuit with negative half wave control electrodes 57 connected to the fourth power supply transformer 52 is electrically conducted when the rectifier circuit with positive half wave control electrodes 56 connected to the fourth power supply transformer 52 is electrically conducted; the rectifier circuits with positive half wave control electrodes and the rectifier circuits with negative half wave control electrodes are connected by a plurality of loads 40, 41, 42, and 43 provided therebetween; and the plurality of the loads are fed by electric power of the power supply transformer by selecting the number of series connections of the plurality of the loads.

With this configuration, switching of selection of the loads and selection of the number of series of the loads can be performed by conductive/nonconductive control of the selected positive and negative rectifier circuits, electric power loss can be reduced, the even-order harmonic current can be further prevented from flowing out to the alternative current three phase lines, and voltage and current to be applied to the loads can be changed.

Embodiment 3

A heating power supply apparatus according to an embodiment 3 will be described on the basis of FIG. 9. In addition, the same reference numerals as those in other embodiments are identical or equivalent portions, and their description in other embodiments will be incorporated into this embodiment. The different points from other embodiments will be mainly described. In the embodiment 3, as in the embodiment 1, there is shown an other example in which a load has negative resistance characteristics; and a large current at low voltage is generated from a small current at high voltage via a medium current at medium voltage while making three stage energization modes, increasing the number of series connections of the loads, and improving a power factor in response to a decrease in resistance value due to energization heating of the negative resistance load.

A bridge circuit 68 having a three phase rectifier circuit with positive half wave control electrodes (abbreviated as positive rectifier circuit) 66 and a three phase rectifier circuit with negative half wave control electrodes (abbreviated as negative rectifier circuit) 67 is connected to a secondary coil (secondary winding) of a power supply transformer 22. Similarly, a bridge circuit 71 having a three phase positive rectifier circuit 69 and a three phase negative rectifier circuit 70 is connected to a secondary coil of a power supply transformer 22. The respective positive rectifier circuits 66 and 69 and the respective negative rectifier circuits 67 and 70 are performed by conductive/nonconductive control and current control during a conductive state by a current control circuit 39. A bridge circuit 26 and a bridge circuit 68 are connected in series. A bridge circuit 29 and the bridge circuit 71 have respective positive rectifier circuits 27 and 69 connected in parallel with each other.

Next, an operation will be described using FIG. 10, FIG. 11, and FIG. 12. In the same drawings, the current control circuit 39 is omitted. First, at initial energization, positive rectifier circuits 24, 27, and 66 and negative rectifier circuits 25, 67, and 70 are electrically conducted at the same time. A small current at high voltage is energized to the respective loads 40 to 43 in energized loops as shown by dotted lines in FIG. 10. That is, the current returns from the positive rectifier circuit 27 being through the load 40 to the negative rectifier circuit 25. The current returns from the positive rectifier circuit 66 being through the load 43 to the negative rectifier circuit 70. The current returns from the positive rectifier circuit 66 being through a series body of the load 42 and the load 41, and being through a negative rectifier circuit 25 and a positive rectifier circuit 24 to the negative rectifier circuit 67.

At this time, each of the load 40 and the load 43 is connected one in series to a voltage one time as large as the power supply transformer voltage (voltage at the end of the secondary winding of the power supply transformer) with respect to a power supply. Meanwhile, the series body of the load 42 and the load 41 are connected two in series to a voltage two times as large as a power supply voltage. Therefore, the same current value can be energized to each of the loads 40, 41, 42, and 43.

With a decrease in resistance due to growth of polycrystalline semiconductors of the loads 40 to 43, electrically-conducting positive and negative rectifier circuits are controlled by the current control circuit 39 to control current, and a current commensurate with the loads 40 to 43 is energized. Then, the energization is shifted to medium-term energization at a time when the power factor becomes a certain value. In the medium-term energization, the positive rectifier circuits 24 and 69 and the negative rectifier circuits 28 and 67 are electrically conducted at the same time. A medium current at medium voltage is energized to the loads 40 to 43 in an energized loop shown by dotted lines in FIG. 11. That is, the current returns from the positive rectifier circuit 69 being through a series body of the loads 40, 41, 42, and 43, and being through the negative rectifier circuit 28 and the positive rectifier circuit 24 to the negative rectifier circuit 67.

At this time, the loads 40 to 43 are connected four in series to a voltage two times as large as the power supply voltage. At this time, direct current output voltage to the series body of the loads 40 to 43 becomes two times as large as a voltage at the end of the initial energization, and the power factor is improved. Thus, with the decrease in resistance due to further growth of the polycrystalline semiconductors of the loads 40 to 43, electrically-conducting positive and negative rectifier circuits are controlled by the current control circuit 39 to control current, and a current commensurate with the loads 40 to 43 is energized, as in at the initial energization. Then, the direct current voltage lowers; and therefore, the power factor is degraded. Consequently, the energization is shifted to final stage energization at a time when the power factor becomes a certain value.

In the final stage energization, the positive rectifier circuits 27 and 69, and the negative rectifier circuits 28 and 70 are electrically conducted at the same time. A large current at low voltage is energized to the loads 40 to 43 in energized loops as shown by dotted lines in FIG. 12. That is, the current returns from the positive rectifier circuit 27 being through the series body of the loads 40 to 43 to the negative rectifier circuit 28. In accordance with the current flow, the current returns from the positive rectifier circuit 69 being through a series body of the loads 40 to 43 to the negative rectifier circuit 70. At this time, currents flowing in the same direction are energized to the series body of the loads 40 to 43. The loads 40 to 43 are connected four in series to a voltage one time as large as the power supply voltage. The positive and negative rectifier circuits 27 and 28, and the positive and negative rectifier circuits 69 and 67 are connected in parallel to the series body of the loads 40 to 43; and therefore, the direct current output voltage becomes ½ of the voltage at the end of the medium-term energization, the power factor is improved, and a current two times as large as the current at the medium-term energization can be outputted.

The switching of the three stage energization modes is performed by selectively switching operation of the respective positive rectifier circuits and the respective negative rectifier circuits; therefore, the thyristor switches are not required in the supplying circuits from the rectifier circuits to the loads as in the known way, and thus, electric power loss can be reduced. The embodiment 3 is composed of four block circuits 26, 29, 68, and 71; and therefore, the object can be achieved by the minimum number in the embodiments. In addition, the loads to be heated, having negative resistance characteristics are described as an example in the embodiment 3; however, of course, the embodiment 3 can be also applied to switching of selection of loads having no negative resistance characteristics.

A heating power supply apparatus of the present invention includes two sets of bridge circuits 26 and 29, each having a rectifier circuit with positive half wave control electrodes and a rectifier circuit with negative half wave control electrodes, and each of the two sets of the bridge circuits being connected to one winding of a first power supply transformer 21; and two sets of bridge circuits 68 and 71, each having a rectifier circuit with positive half wave control electrodes and a rectifier circuit with negative half wave control electrodes, and each of the two sets of the bridge circuits being connected to one winding of a second power supply transformer 22. One of the bridge circuits 26 connected to the first power supply transformer 21 and one of the bridge circuits 68 connected to the second power supply transformer 22 are connected in series; the other of the bridge circuits 29 connected to the first power supply transformer 21 and the other of the bridge circuits 71 connected to the second power supply transformer 22 are connected in parallel by connecting each other's ends of the rectifier circuits with positive half wave control electrodes 27 and 69; the rectifier circuit with negative half wave control electrodes selected from a plurality of the bridge circuits 26 and 29 connected to the first power supply transformer 21 is electrically conducted when a predetermined the rectifier circuit with positive half wave control electrodes of the plurality of the bridge circuits 26 and 29 connected to the first power supply transformer 21 is electrically conducted; the rectifier circuit with negative half wave control electrodes selected from a plurality of the bridge circuits 68 and 71 connected to the second power supply transformer 22 is electrically conducted when a predetermined the rectifier circuit with positive half wave control electrodes of the plurality of the bridge circuits 68 and 71 connected to the second power supply transformer 22 is electrically conducted; the rectifier circuits with positive half wave control electrodes and the rectifier circuits with negative half wave control electrodes are connected by a plurality of loads provided therebetween; and the plurality of the loads are fed by electric power of the power supply transformer by selecting parallel or series or both.

With this configuration, switching of selection of the loads and selection of the number of series or parallel of the loads can be performed by conductive/nonconductive control of the selected positive and negative rectifier circuits, electric power loss can be reduced, and voltage and current to be applied to the loads can be changed.

Embodiment 4

A heating power supply apparatus according to an embodiment 4 will be described on the basis of FIG. 13. In addition, the same reference numerals as those in other embodiments are identical or equivalent portions, and their description in other embodiments will be incorporated into this embodiment. The different points from other embodiments will be mainly described. In the embodiment 4, as in the embodiment 1, there is shown an other example in which a load has negative resistance characteristics; and a large current at low voltage is generated from a small current at high voltage via a medium current at medium voltage while making three stage energization modes, increasing the number of series connections of the loads, and improving a power factor in response to a decrease in resistance value due to energization heating of the negative resistance load.

A bridge circuit 79 having a three phase rectifier circuit with positive half wave control electrodes (abbreviated as positive rectifier circuit) 77 and a three phase rectifier circuit with negative half wave control electrodes (abbreviated as negative rectifier circuit) 78 is connected to a secondary coil (secondary winding) of a power supply transformer 76. Similarly, a bridge circuit 83 having a three phase positive rectifier circuit 81 and a three phase negative rectifier circuit 82 is connected to a secondary coil of a power supply transformer 80. The respective positive rectifier circuits 77 and 81 and the respective negative rectifier circuits 78 and 82 are performed by conductive/nonconductive control and current control during a conductive state by a current control circuit 39. A bridge circuit 29 and a bridge circuit 71 are connected in series. A bridge circuit 79 and a bridge circuit 83 are connected in series. A bridge circuit 26, a series body of the bridge circuits 79 and 83, and a bridge circuit 68 are connected inversely in series.

Next, an operation will be described using FIG. 14, FIG. 15, and FIG. 16. In the same drawings, the current control circuit 39 is omitted. First, at initial energization, positive rectifier circuits 24, 66, 77, and 81 and negative rectifier circuits 25, 67, 78, and 82 are electrically conducted at the same time. A small current at high voltage is energized to respective loads 40 to 43 in energized loops as shown by dotted lines in FIG. 14. That is, the current returns from the positive rectifier circuit 24 being through the load 40 to the negative rectifier circuit 25. The current returns from the positive rectifier circuit 66 being through the load 43 to the negative rectifier circuit 67. The current returns from the positive rectifier circuit 81 being through a series body of the load 42 and the load 41, and being through the negative rectifier circuit 78 and the positive rectifier circuit 77 to the negative rectifier circuit 82.

At this time, each of the load 40 and the load 43 is connected one in series to a voltage one time as large as the power supply transformer voltage (voltage at the end of the secondary winding of the power supply transformer) with respect to a power supply. Meanwhile, the series body of the load 42 and the load 41 are connected two in series to a voltage two times as large as a power supply voltage. Therefore, the same current value can be energized to each of the loads 40, 41, 42, and 43.

With a decrease in resistance due to growth of polycrystalline semiconductors of the loads 40 to 43, electrically-conducting positive and negative rectifier circuits are controlled by the current control circuit 39 to control current, and a current commensurate with the loads 40 to 43 is energized. Then, the energization is shifted to medium-term energization at a time when the power factor becomes a certain value. In the medium-term energization, positive rectifier circuits 27 and 69, and negative rectifier circuits 28 and 70 are electrically conducted at the same time. A medium current at medium voltage is energized to the loads 40 to 43 in an energized loop shown by dotted lines in FIG. 15. That is, the current returns from the positive rectifier circuit 27 being through the negative rectifier circuit 70 and the positive rectifier circuit 69, and being through a series body of the loads 40, 41, 42, and 43 to the negative rectifier circuit 28.

At this time, the loads 40 to 43 are connected four in series to a voltage two times as large as the power supply voltage. At this time, direct current output voltage to the series body of the loads 40 to 43 becomes two times as large as a voltage at the end of the initial energization, and the power factor is improved. Thus, with the decrease in resistance due to further growth of the polycrystalline semiconductors of the loads 40 to 43, electrically-conducting positive and negative rectifier circuits are controlled by the current control circuit 39 to control current, and a current commensurate with the loads 40 to 43 is energized, as in at the initial energization. Then, the direct current voltage lowers; and therefore, the power factor is degraded. Consequently, the energization is shifted to final stage energization at a time when the power factor becomes a certain value.

In the final stage energization, the positive rectifier circuits 24 and 69, and the negative rectifier circuits 28 and 67 are electrically conducted at the same time. A large current at low voltage is energized to the loads 40 to 43 in energized loops as shown by dotted lines in FIG. 16. That is, the current returns from the positive rectifier circuit 24 being through the series body of the loads 40 to 43 to the negative rectifier circuit 28. In accordance with the current flow, the current returns from the positive rectifier circuit 69 being through a series body of the loads 40 to 43 to the negative rectifier circuit 67. At this time, currents flowing in the same direction are energized to the series body of the loads 40 to 43. The loads 40 to 43 are connected four in series to a voltage one time as large as the power supply voltage. The positive and negative rectifier circuits 24 and 28, and the positive and negative rectifier circuits 69 and 67 are connected in parallel to the series body of the loads 40 to 43; and therefore, the direct current output voltage becomes ½ of the voltage at the end of the medium-term energization, the power factor is improved, and a current two times as large as the current at the medium-term energization can be outputted.

In addition, when there is a variation in characteristics of the loads 40 to 43 at the initial energization, in the aforementioned embodiment 3, the respective rectifier circuits with positive half wave control electrodes 24, 27, and 66, and the rectifier circuits with negative half wave control electrodes 25, 67, and 70 are in asymmetry control, and even-order harmonic current flows out to alternative current three phase lines 23. However, in the present embodiment 4, four bridge circuits 26, 79, 83, and 68 are provided for four loads 40, 41, 42, and 43 at the initial energization; and therefore, all of the circuits are in symmetry control, and it is possible to prevent the even-order harmonic current from flowing out to the alternative current three phase lines 23.

The switching of the three stage energization modes is performed by selectively switching operation of the respective positive rectifier circuits and the respective negative rectifier circuits; therefore, the thyristor switches are not required in the supplying circuits from the rectifier circuits to the loads as in the known way, and thus, electric power loss can be reduced. In addition, when there is also a variation in characteristics of the loads 40 to 43 at the initial energization, it is possible to prevent the even-order harmonic current from flowing out to the alternative current three phase lines 23. In addition, the above case is configured by two sets of the power supply transformers 76 and 80, and two sets of the bridge circuits 79 and 83; however, if one set of a power supply transformer has its secondary coil where a voltage two times as large as the voltage at the secondary coil of the power supply transformer 21 is generated, the above configuration can be put together into one bridge circuit. The loads to be heated, having negative resistance characteristics are described as an example in the embodiment 4; however, of course, the embodiment 4 can be also applied to switching of selection of loads having no negative resistance characteristics.

A heating power supply apparatus of the present invention includes two sets of bridge circuits 26 and 29, each having a rectifier circuit with positive half wave control electrodes and a rectifier circuit with negative half wave control electrodes, and each of the two sets of the bridge circuits being connected to one winding of a first power supply transformer 21; two sets of bridge circuits 68 and 71, each having a rectifier circuit with positive half wave control electrodes and a rectifier circuit with negative half wave control electrodes, and each of the two sets of the bridge circuits being connected to one winding of a second power supply transformer 22; and a bridge circuit having a rectifier circuit with positive half wave control electrodes and a rectifier circuit with negative half wave control electrodes, the bridge circuit being connected to a third power supply transformer. One set 29 of the bridge circuits 26 and 29 connected to the first power supply transformer 21 and one set 71 of the bridge circuits 68 and 71 connected the second power supply transformer are connected in series; the rectifier circuit with negative half wave control electrodes selected from a plurality of the bridge circuits 26 and 29 connected to the first power supply transformer 21 is electrically conducted when a predetermined the rectifier circuit with positive half wave control electrodes of the plurality of the bridge circuits 26 and 29 connected to the first power supply transformer 21 is electrically conducted; the rectifier circuit with negative half wave control electrodes selected from the plurality of the bridge circuits 68 and 71 connected to the second power supply transformer 22 is electrically conducted when a predetermined the rectifier circuit with positive half wave control electrodes of the plurality of the bridge circuits 68 and 71 connected to the second power supply transformer 22 is electrically conducted; the rectifier circuit with negative half wave control electrodes connected to the third power supply transformer is electrically conducted when the rectifier circuit with positive half wave control electrodes connected to the third power supply transformer is electrically conducted; the rectifier circuit with positive half wave control electrodes and the rectifier circuit with negative half wave control electrodes are connected by a plurality of loads provided therebetween; and the plurality of the loads are fed by electric power of the power supply transformer by selecting parallel or series or both.

With this configuration, switching of selection of the loads and selection of the number of series or parallel of the loads can be performed by conductive/nonconductive control of the selected positive and negative rectifier circuits, electric power loss can be reduced, the even-order harmonic current can be further prevented from flowing out to the alternative current three phase lines, and voltage and current to be applied to the loads can be changed.

DESCRIPTION OF REFERENCE NUMERALS

Figure 1:
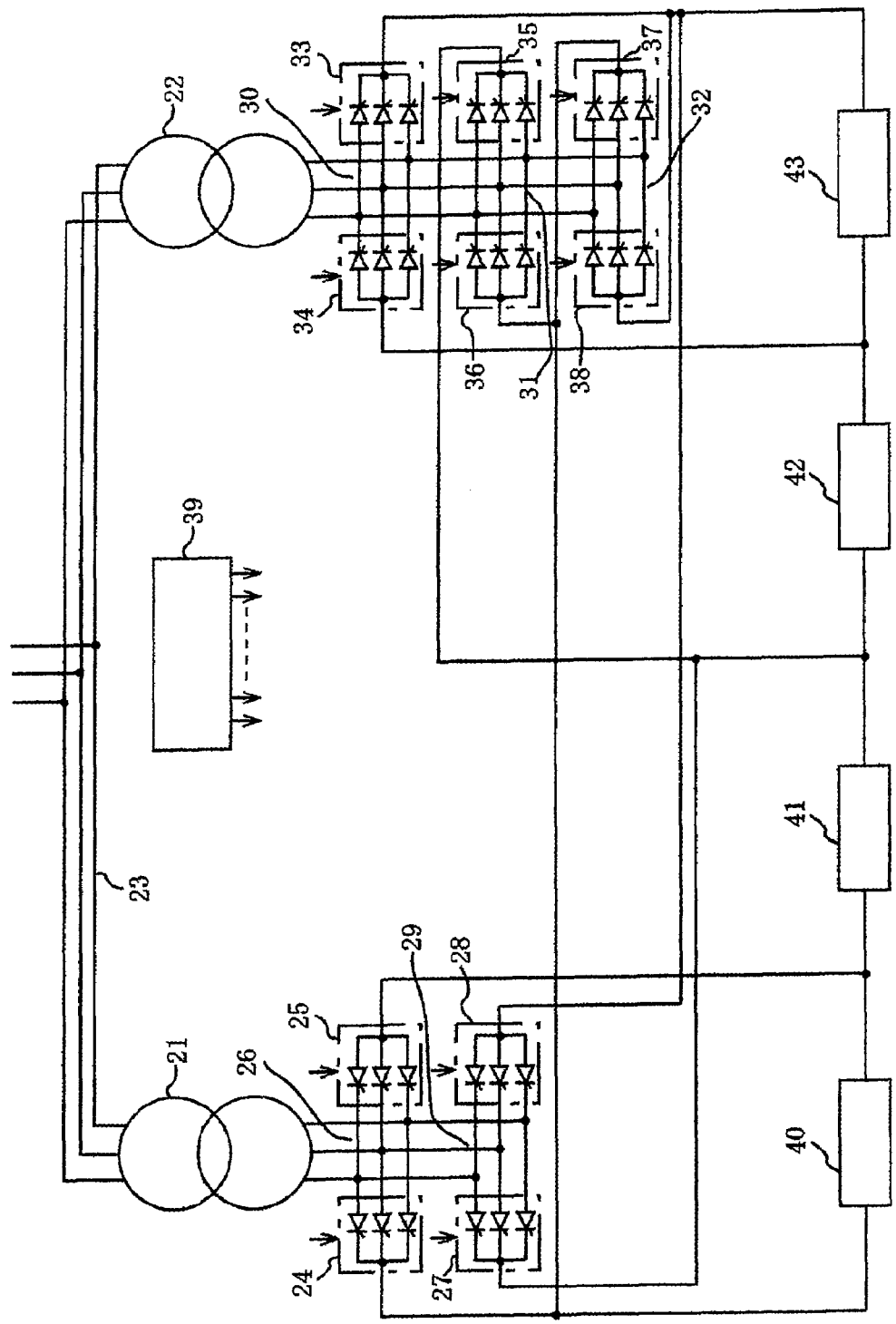
FIG. 1 is a configuration diagram showing a heating power supply apparatus according to an embodiment 1 of the present invention.
Figure 2:
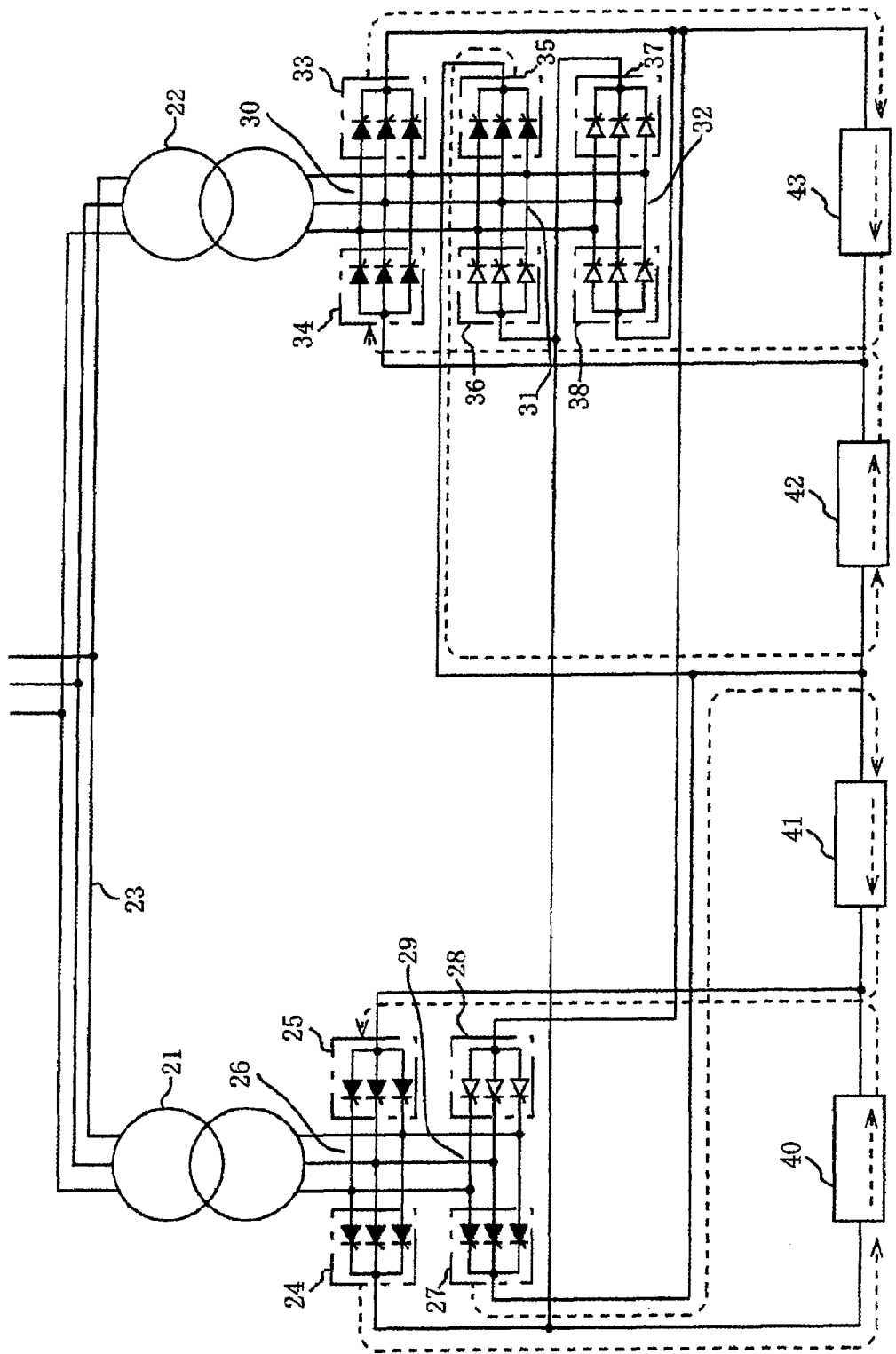
FIG. 2 is an operation diagram for explaining an operation in an initial mode of the embodiment 1.
Figure 3:
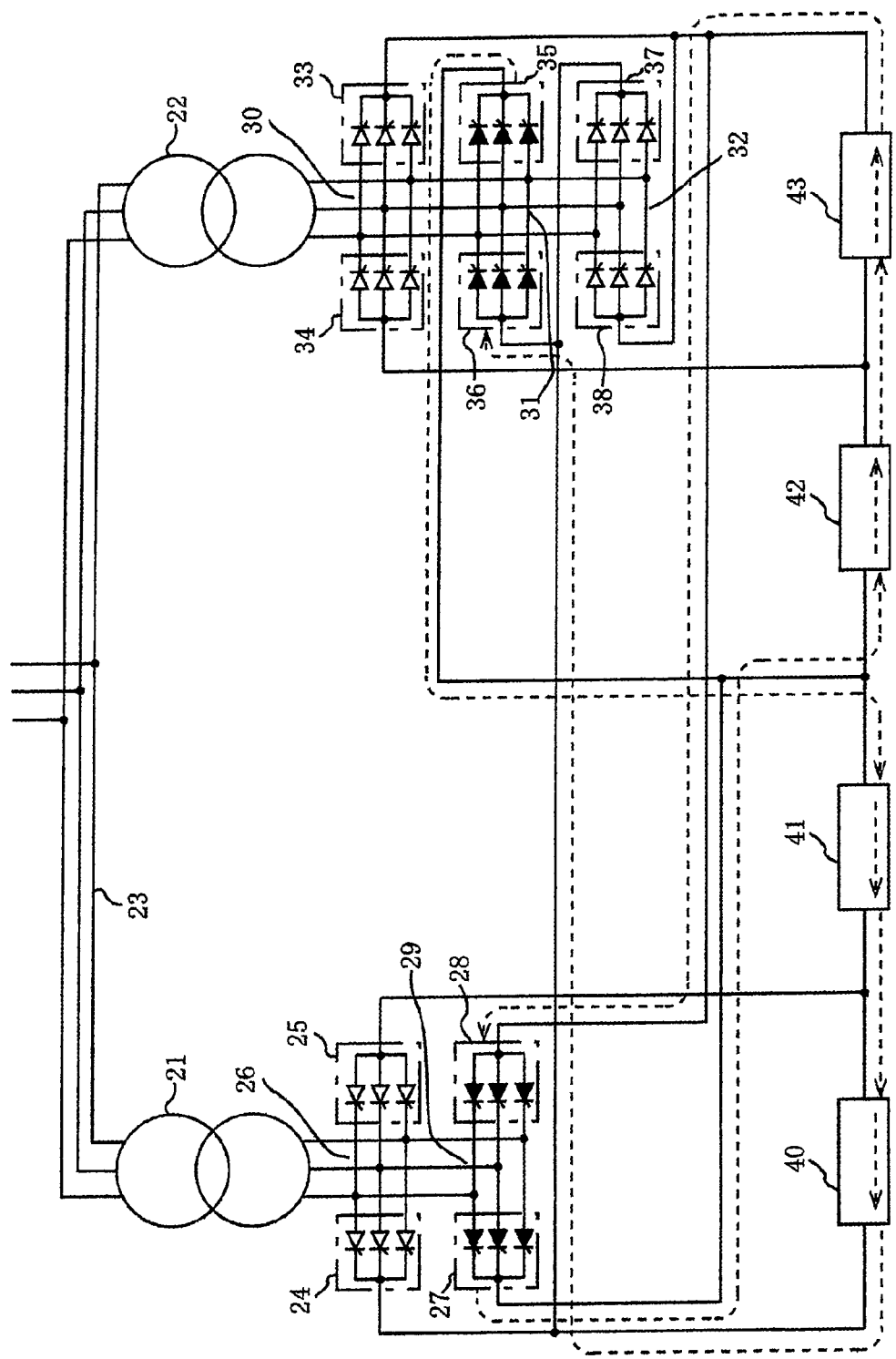
FIG. 3 is an operation diagram for explaining an operation in a medium-term mode of the embodiment 1.
Figure 4:
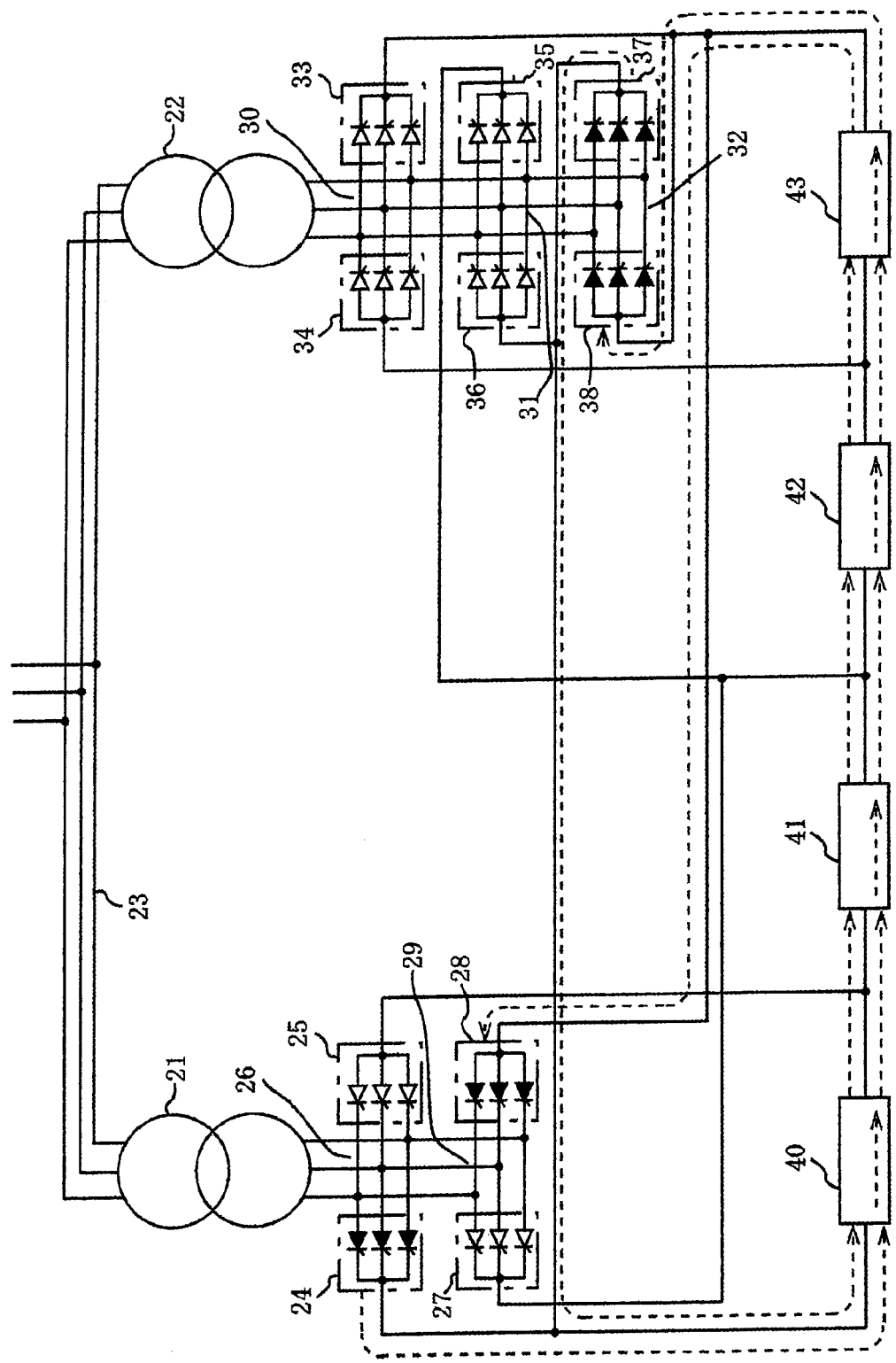
FIG. 4 is an operation diagram for explaining an operation in a final stage mode of the embodiment 1.
Figure 5:
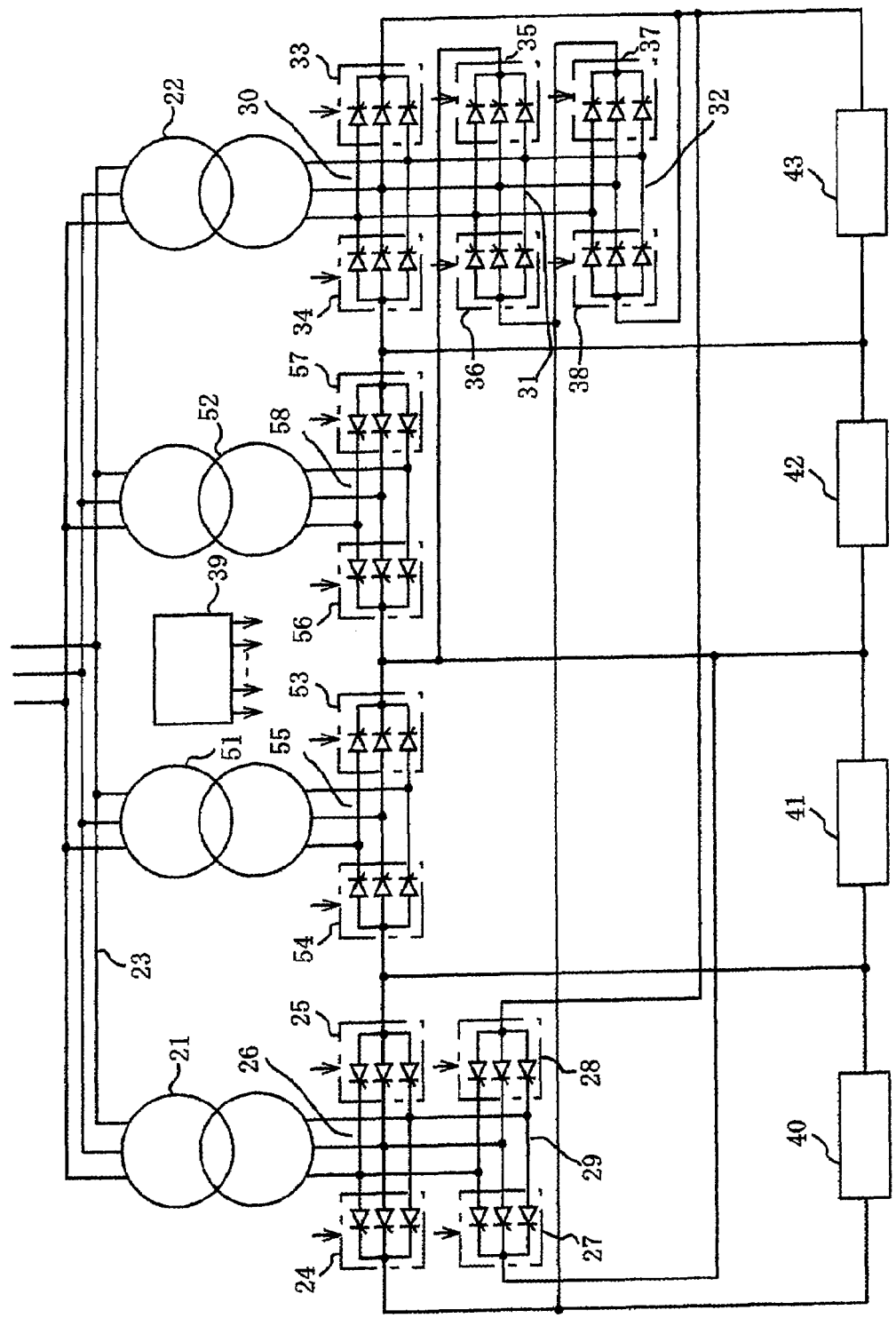
FIG. 5 is a configuration diagram showing a heating power supply apparatus according to an embodiment 2.
Figure 6:
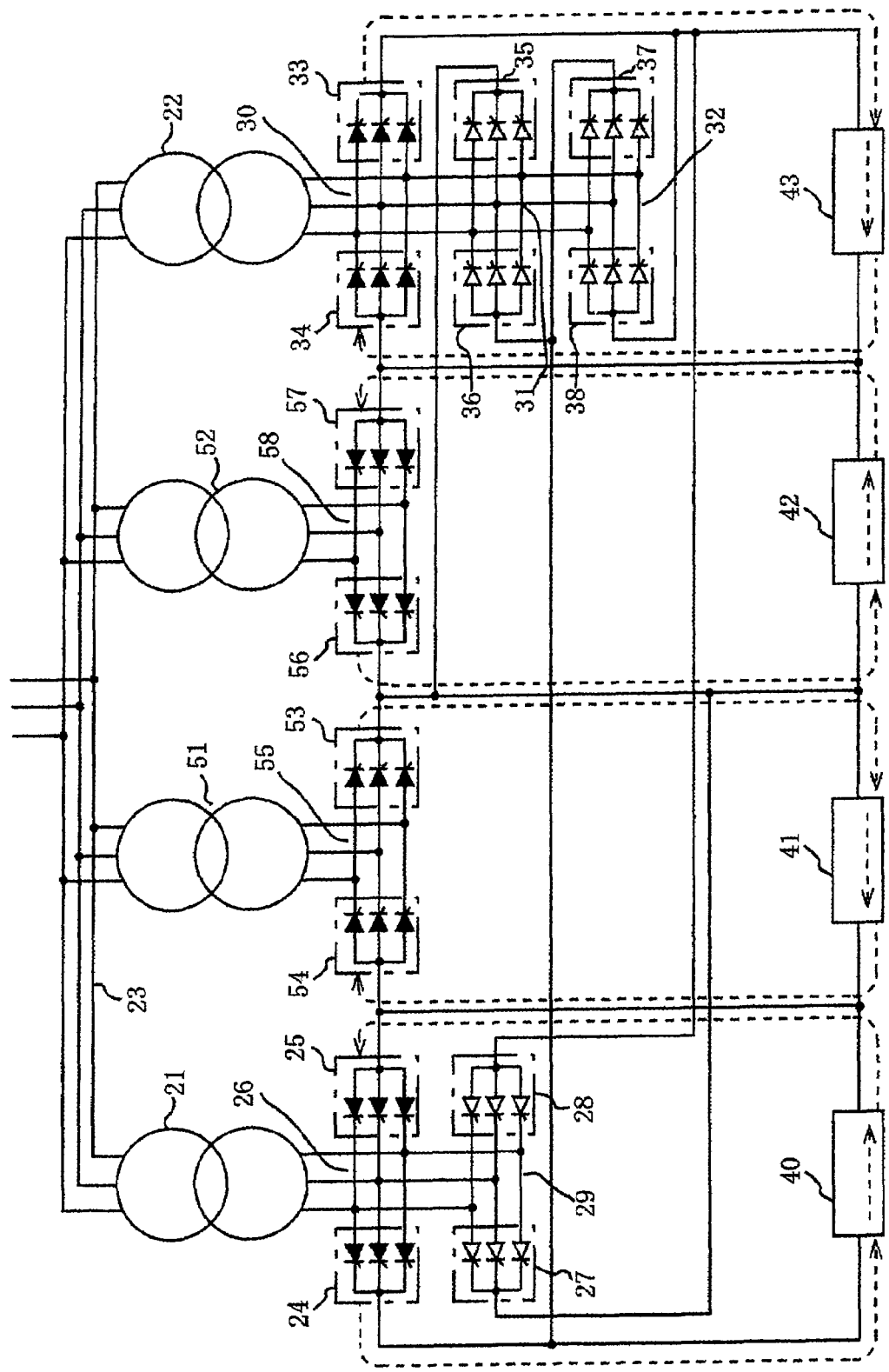
FIG. 6 is an operation diagram for explaining an operation in an initial mode of the embodiment 2.
Figure 7:
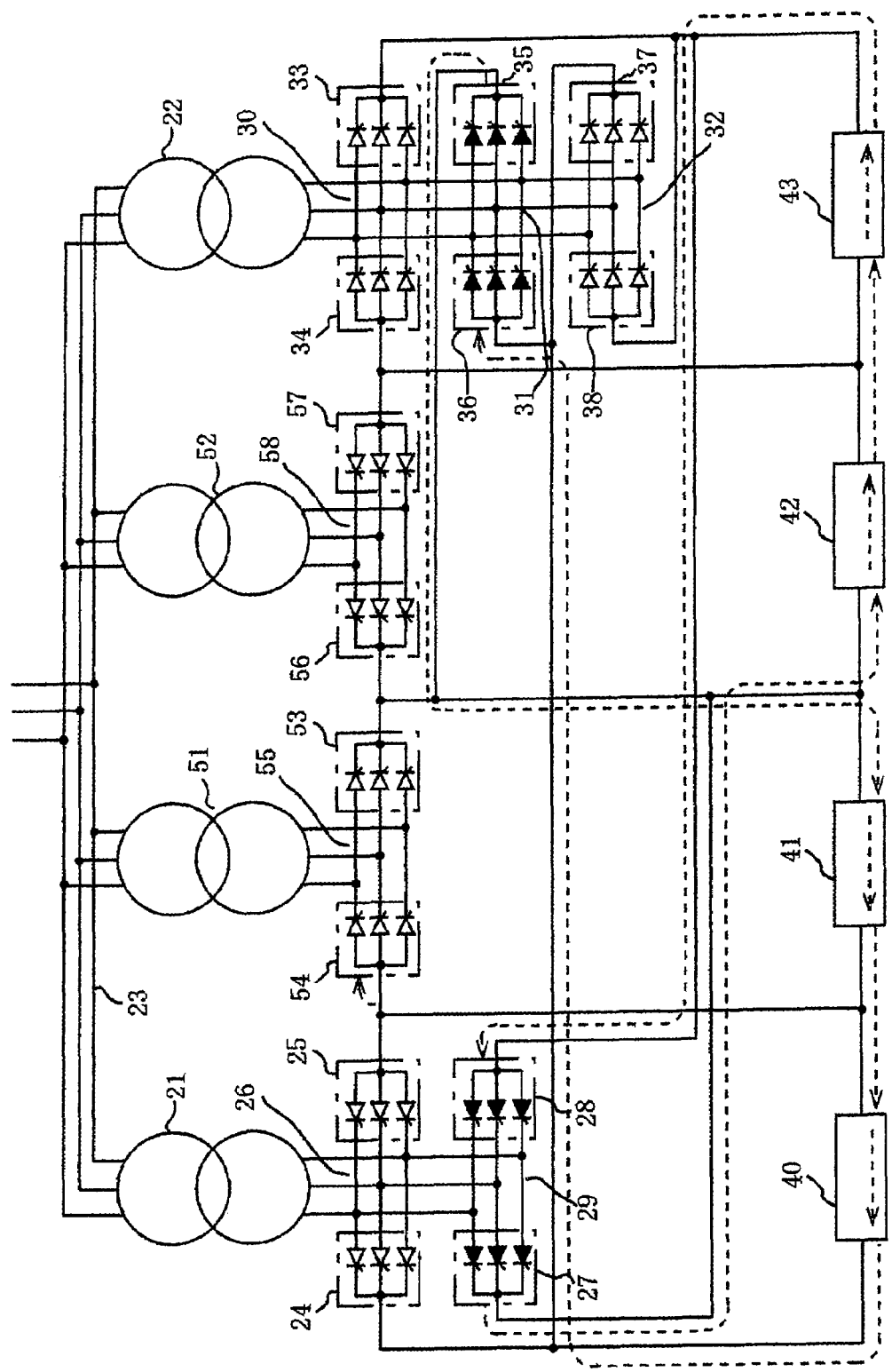
FIG. 7 is an operation diagram for explaining an operation in a medium-term mode of the embodiment 2.
Figure 8:
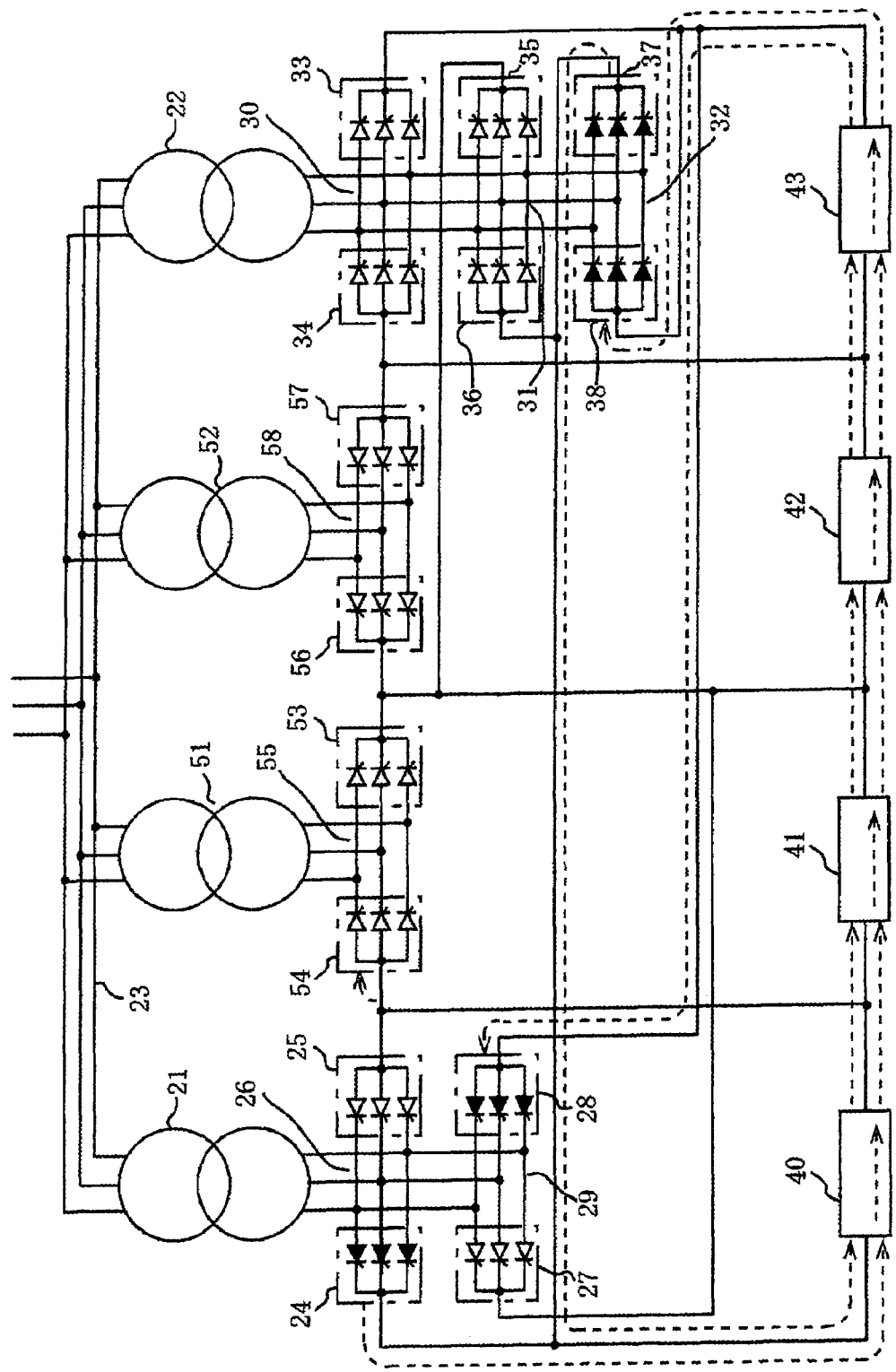
FIG. 8 is an operation diagram for explaining an operation in a final stage mode of the embodiment 2.
Figure 9:
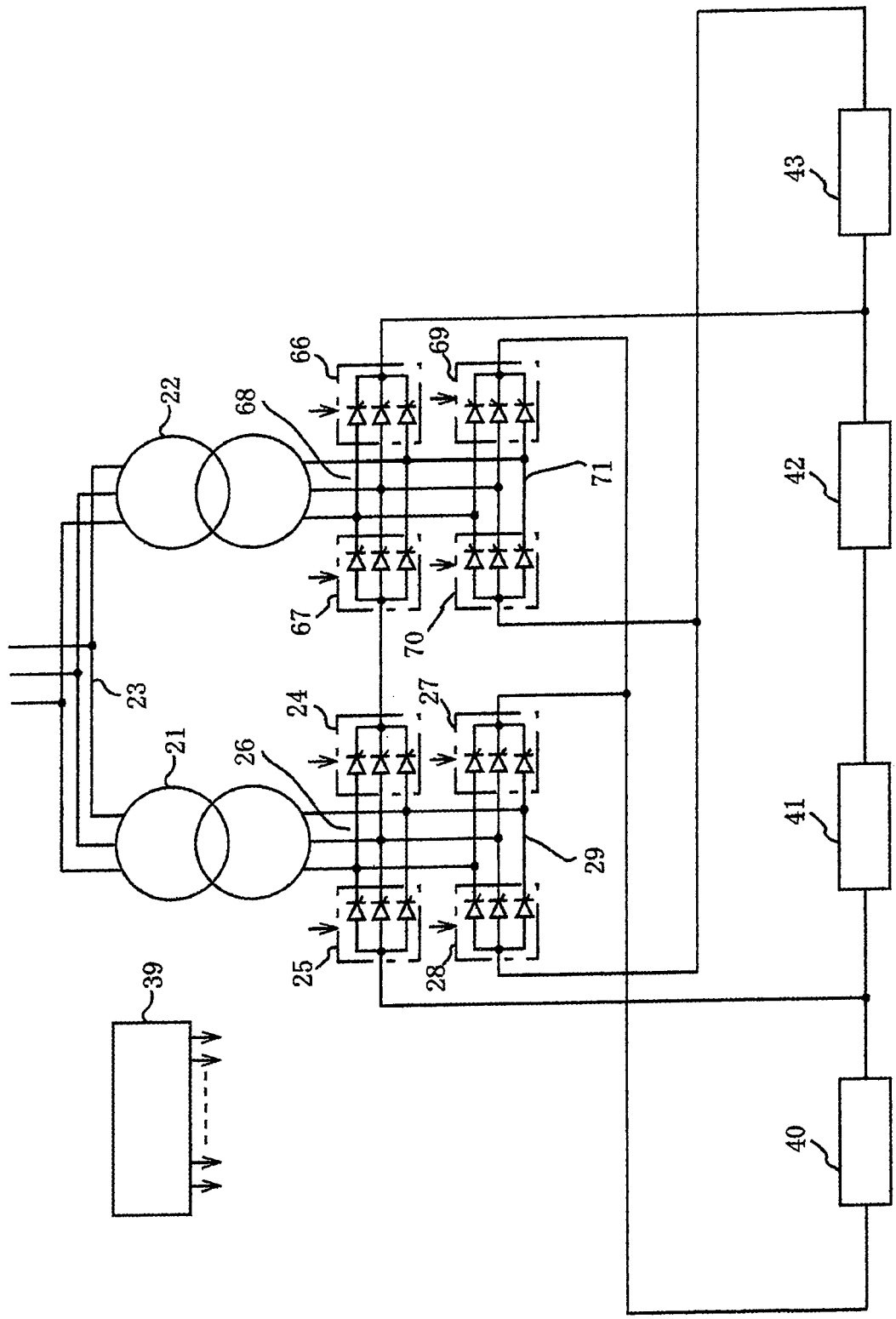
FIG. 9 is a configuration diagram showing a heating power supply apparatus according to an embodiment 3.
Figure 10:
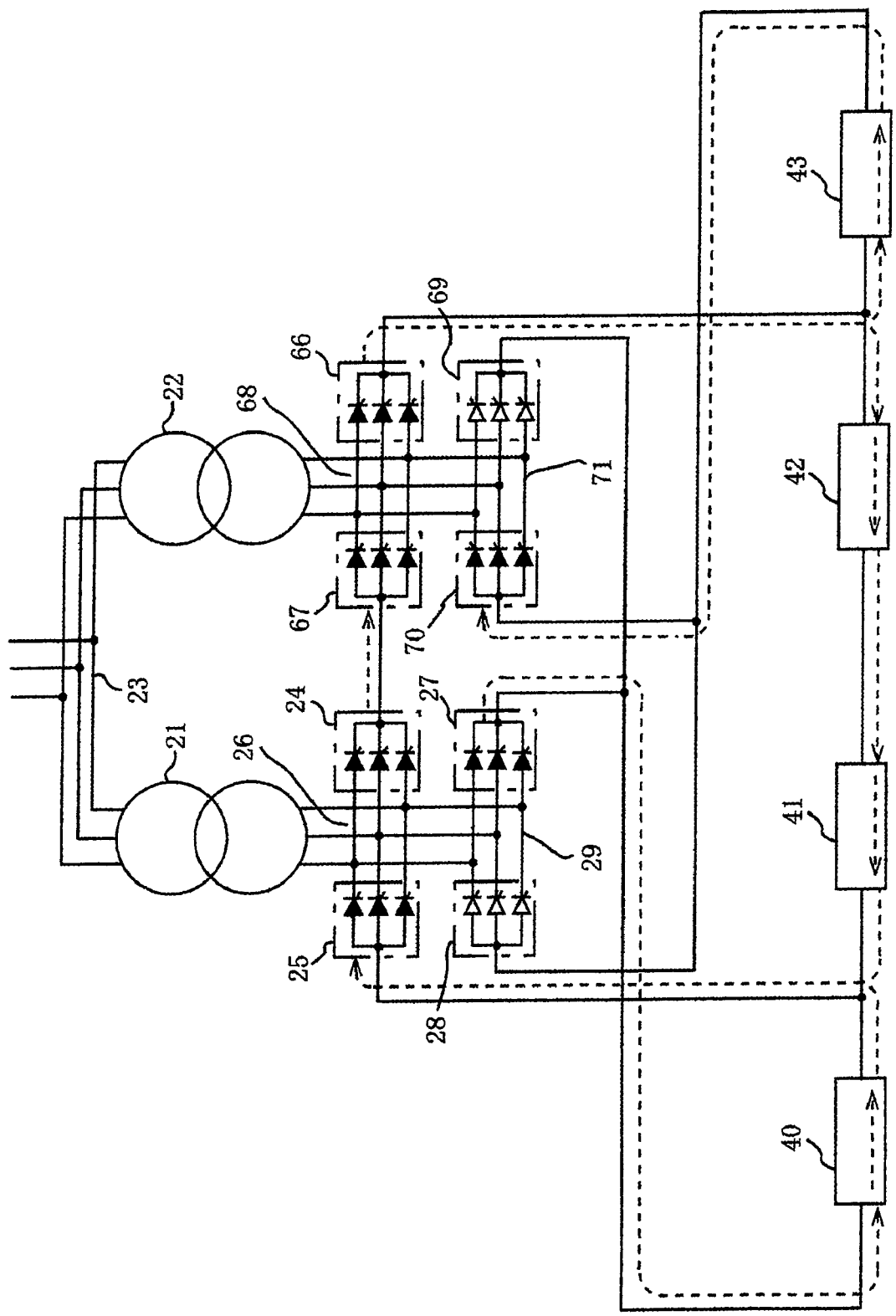
FIG. 10 is an operation diagram for explaining an operation in an initial mode of the embodiment 3.
Figure 11:
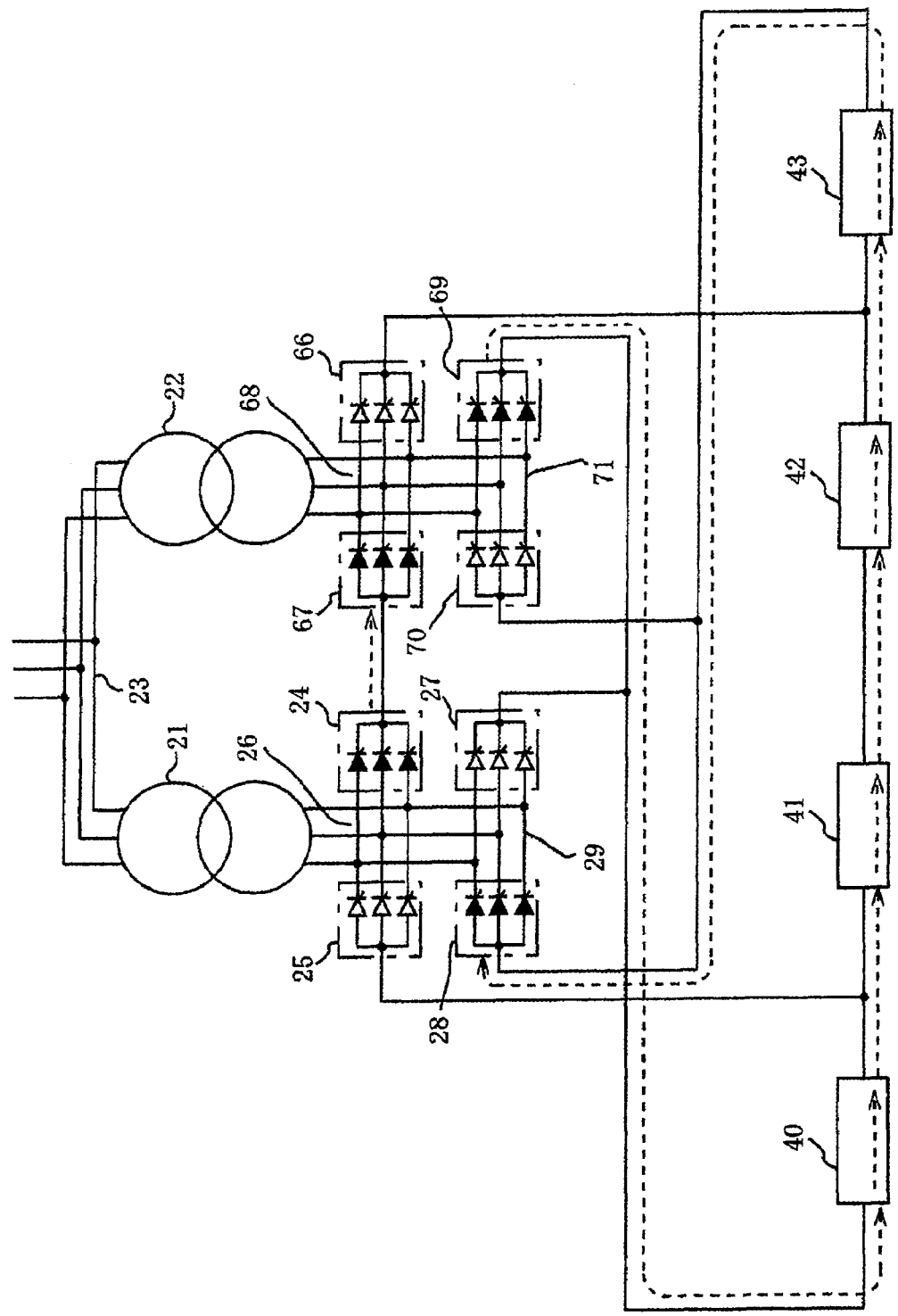
FIG. 11 is an operation diagram for explaining an operation in a medium-term mode of the embodiment 3.
Figure 12:
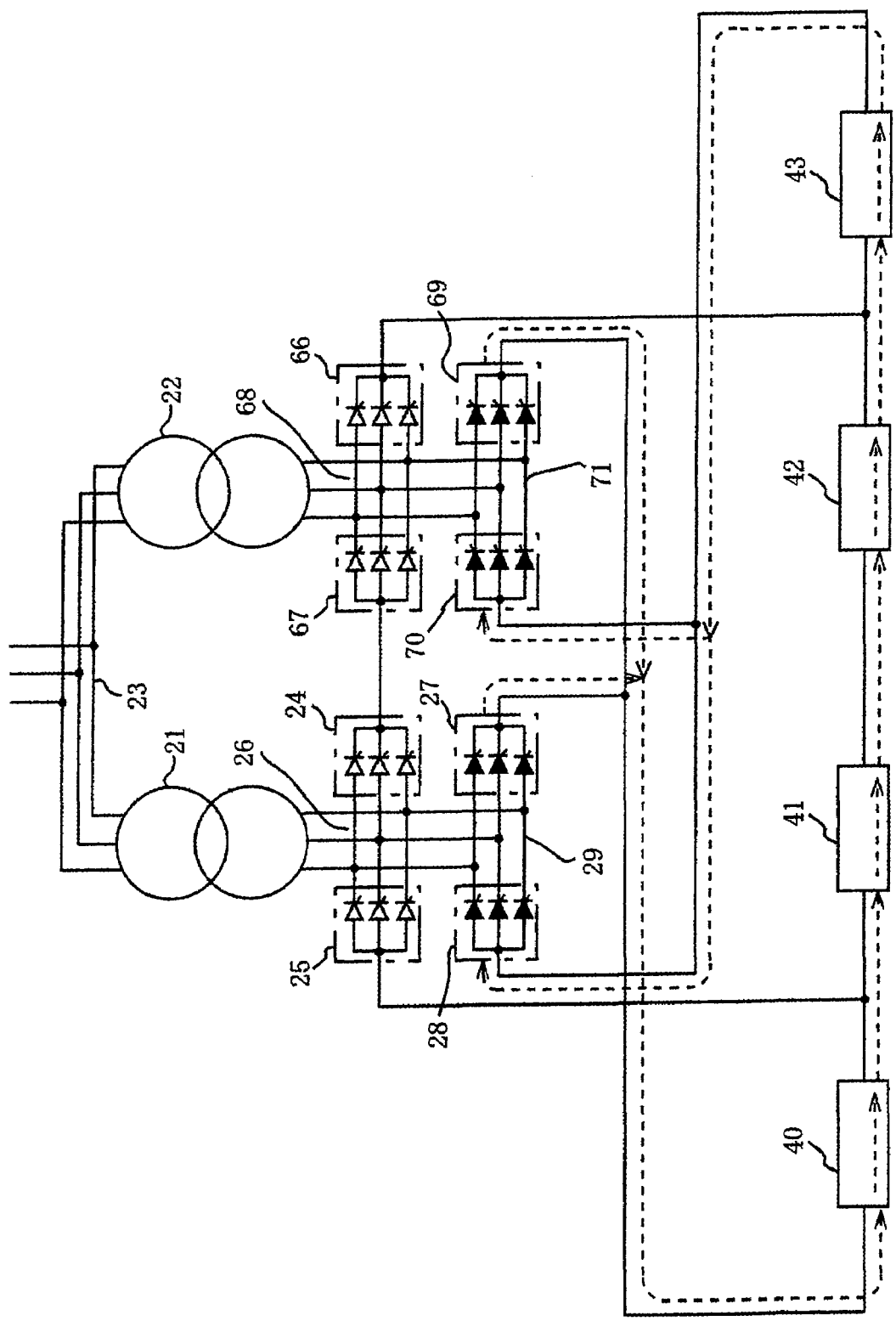
FIG. 12 is an operation diagram for explaining an operation in a final stage mode of the embodiment 3.
Figure 13:
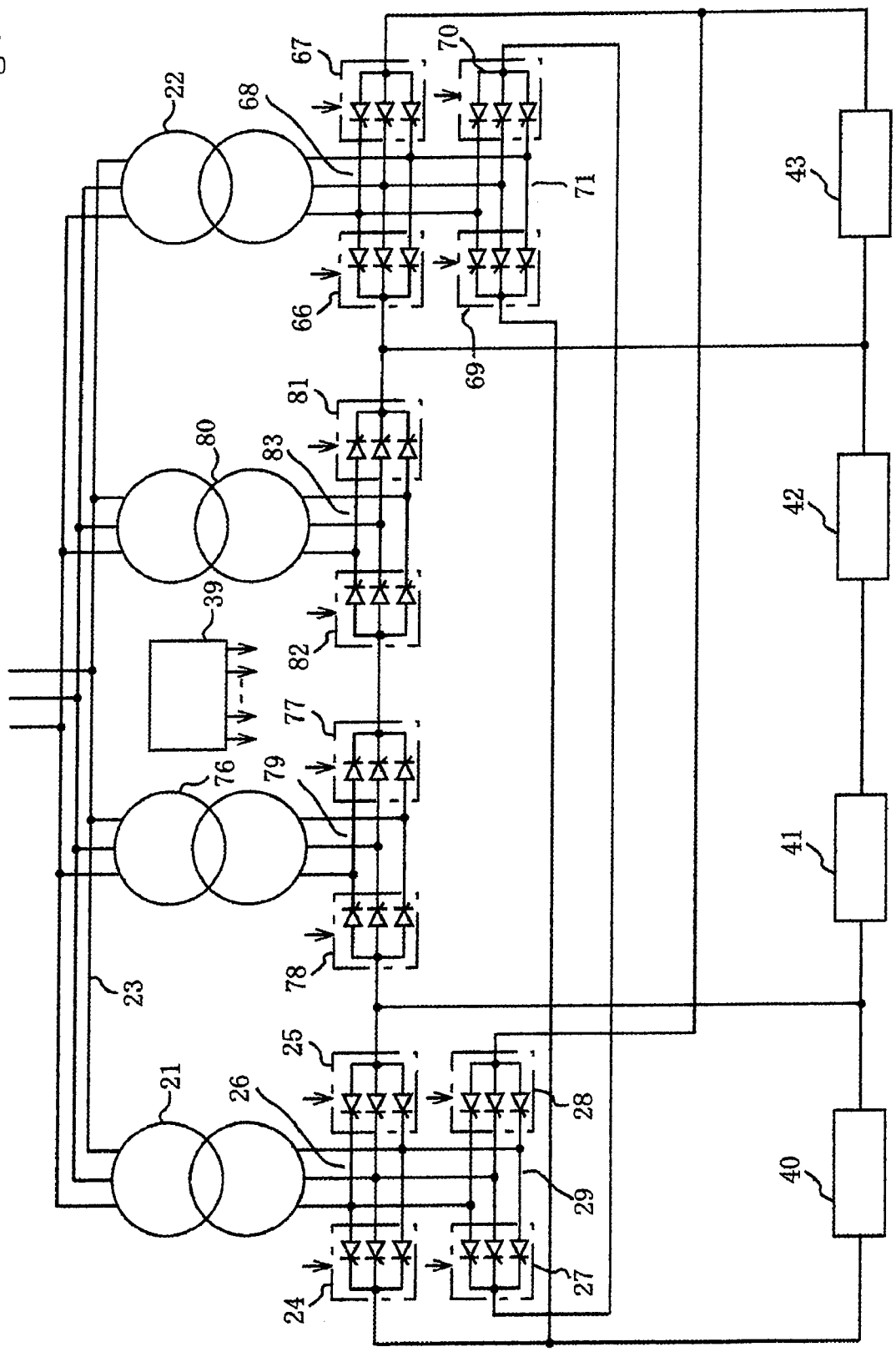
FIG. 13 is a configuration diagram showing a heating power supply apparatus according to an embodiment 4.
Figure 14:
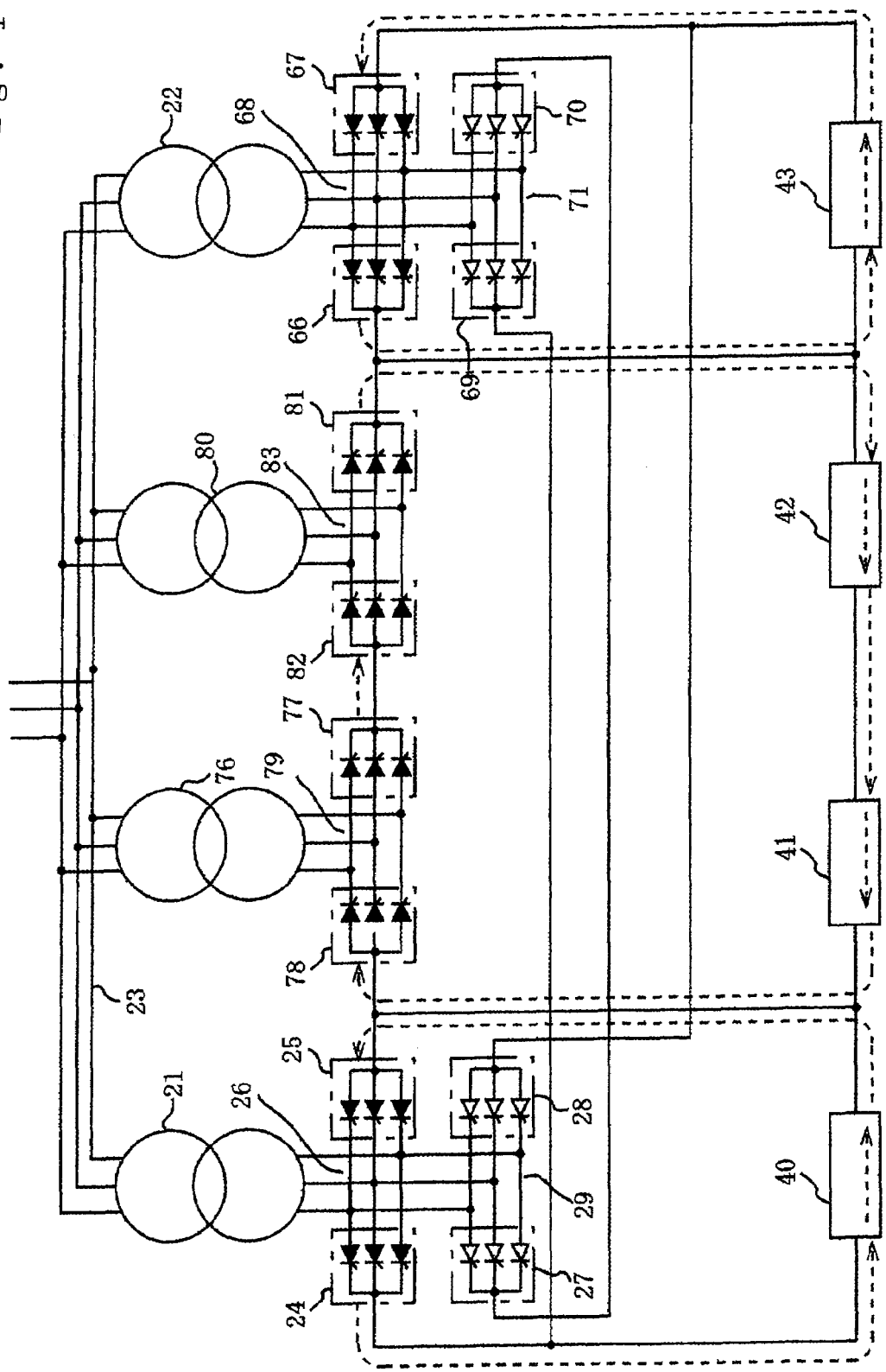
FIG. 14 is an operation diagram for explaining an operation in an initial mode of the embodiment 4.
Figure 15:
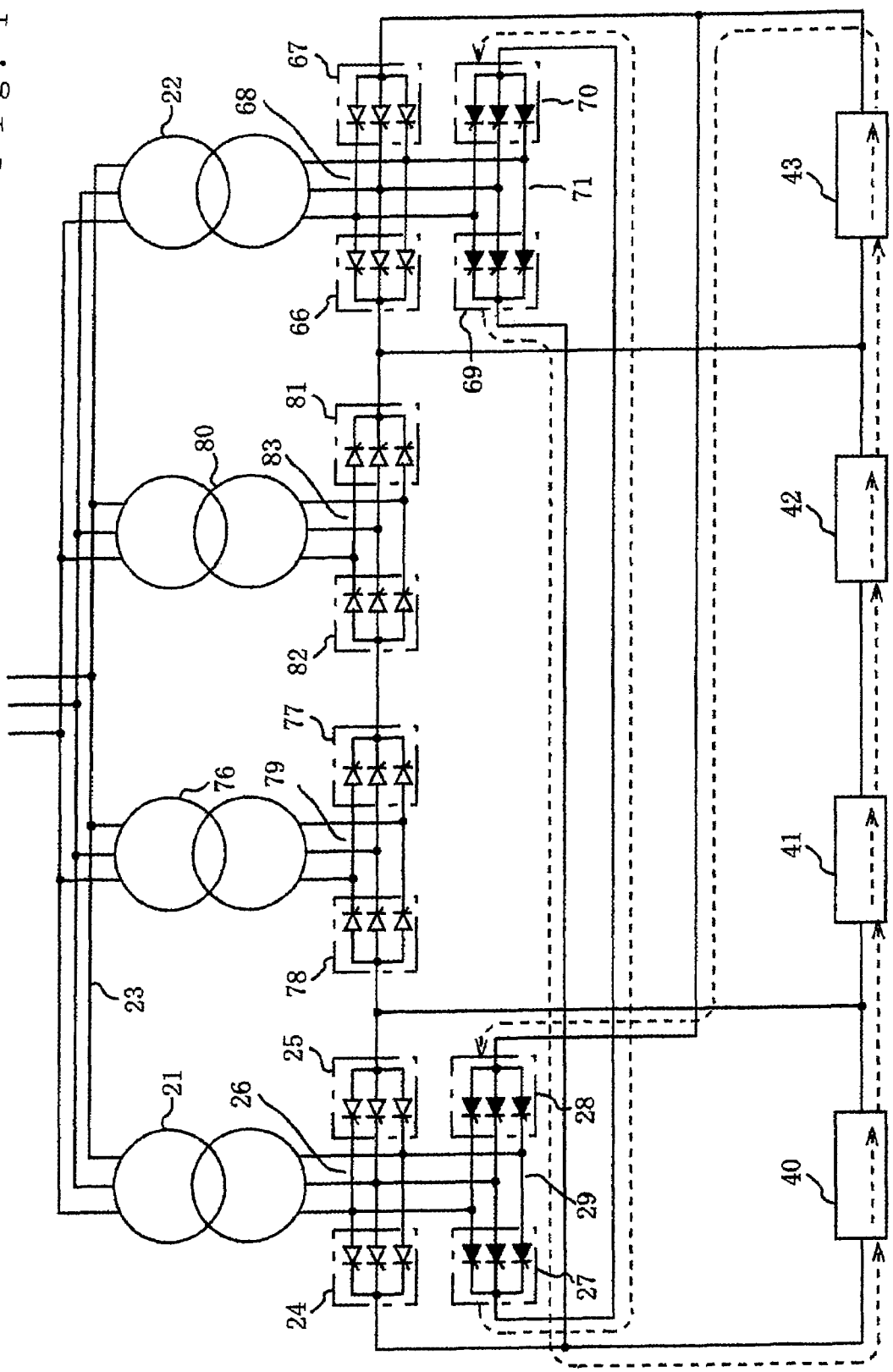
FIG. 15 is an operation diagram for explaining an operation in a medium-term mode of the embodiment 4.
Figure 16:
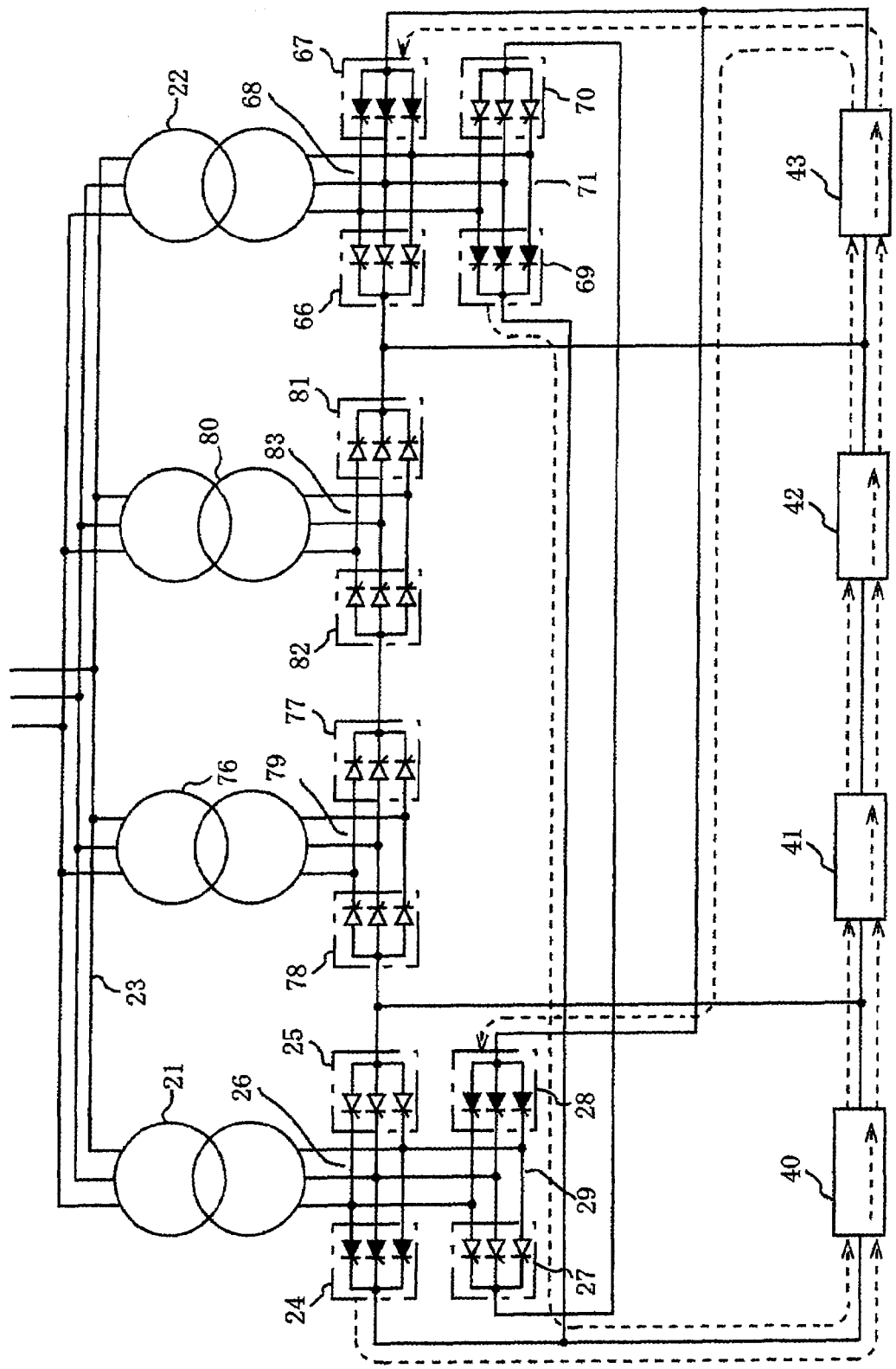
FIG. 16 is an operation diagram for explaining an operation in a final stage mode of the embodiment 4.
Figure 17:
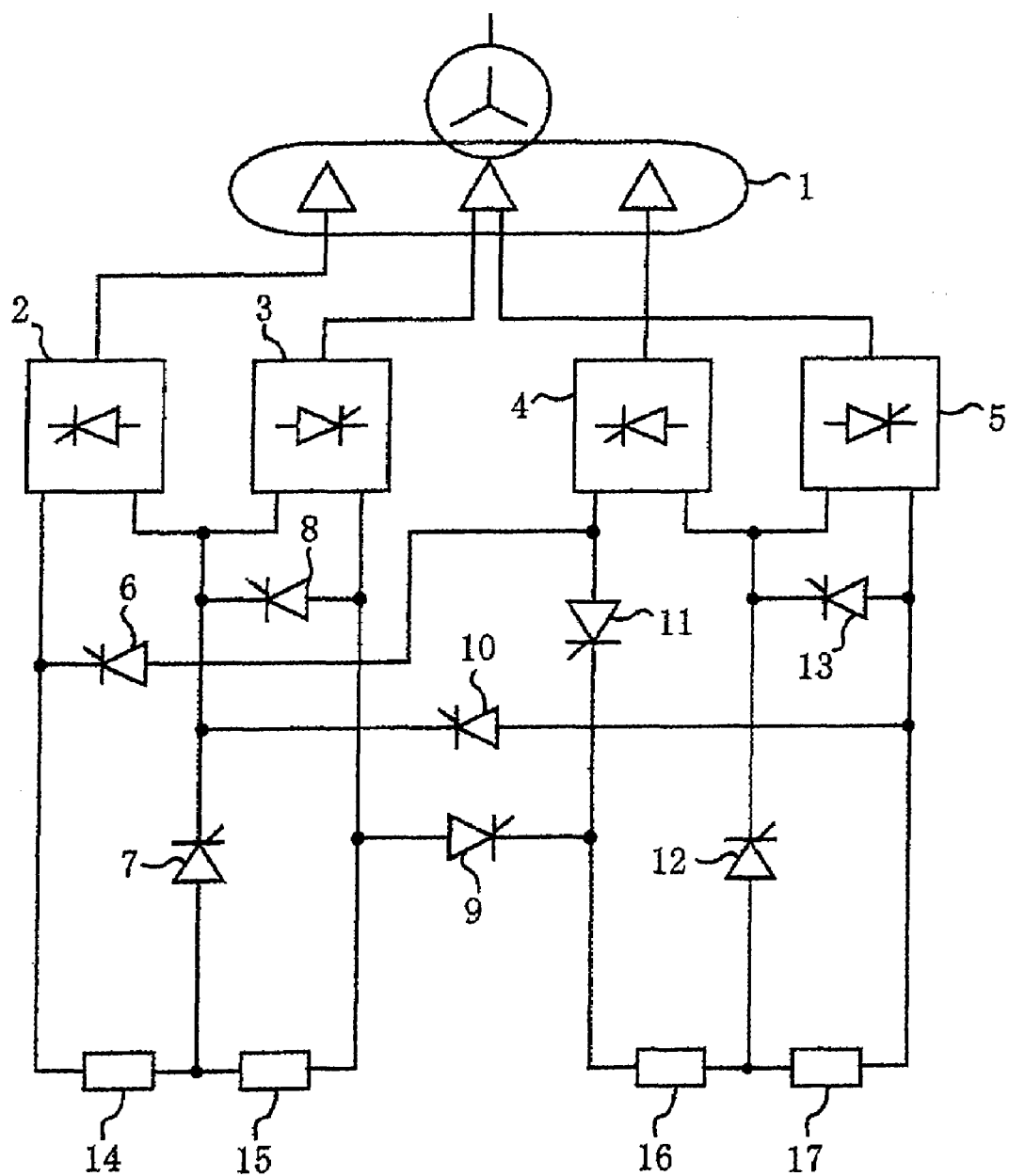
FIG. 17 is a configuration diagram showing a known heating power supply apparatus.
Figure 18:
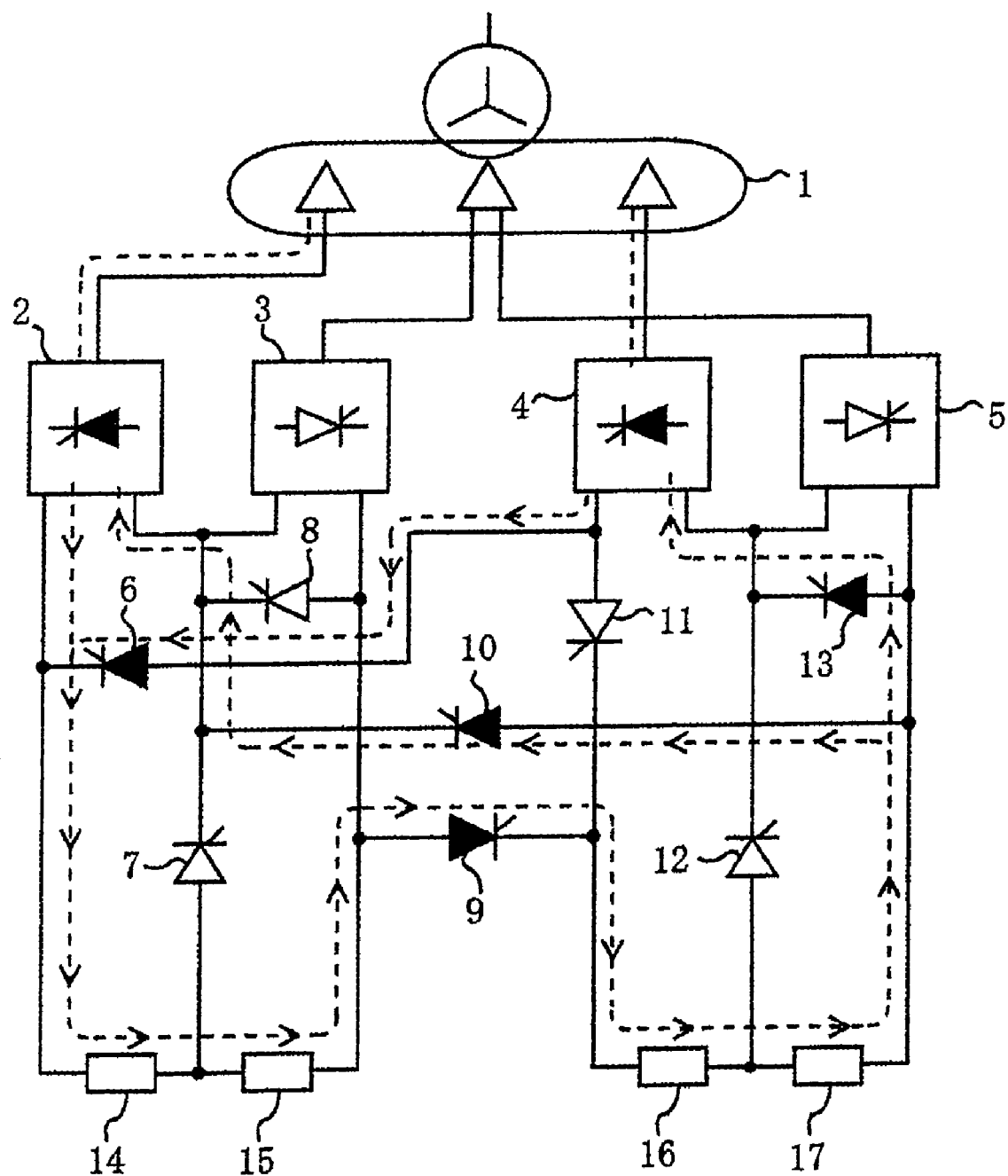
FIG. 18 is an operation diagram for explaining an operation of the known heating power supply apparatus.

1 Four-winding transformer
2 to 5 Thyristor rectifier
6 to 13 Semiconductor switch
14 to 17 Load
21 and 22 Power supply transformer
23 Alternative current three phase lines
24 Rectifier circuit with positive half wave control electrodes (Positive rectifier circuit)
25 Rectifier circuit with negative half wave control electrodes (Negative rectifier circuit)
26 Bridge circuit
27 Positive rectifier circuit
28 Negative rectifier circuit
29 Bridge circuit
30, 31, and 32 Bridge circuit
33 Positive rectifier circuit
34 Negative rectifier circuit
35 Positive rectifier circuit
36 Negative rectifier circuit
37 Positive rectifier circuit
38 Negative rectifier circuit
39 Current control circuit
40 to 43 Load
51 and 52 Power supply transformer
53 Positive rectifier circuit
54 Negative rectifier circuit
55 Bridge circuit
56 Positive rectifier circuit
57 Negative rectifier circuit
58 Bridge circuit
66 Positive rectifier circuit
67 Negative rectifier circuit
68 Bridge circuit
69 Positive rectifier circuit
70 Negative rectifier circuit
71 Bridge circuit
76 Power supply transformer
77 Positive rectifier circuit
78 Negative rectifier circuit
79 Bridge circuit
80 Power supply transformer
81 Positive rectifier circuit
82 Negative rectifier circuit
83 Bridge circuit

The invention claimed is:

1. A heating power supply apparatus comprising a plural number of bridge circuits, each having a rectifier circuit with positive half wave control electrodes and a rectifier circuit with negative half wave control electrodes, and each of the plural number of said bridge circuits being connected to one winding of a power supply transformer, wherein said rectifier circuit with negative half wave control electrodes selected from the plurality of said bridge circuits is electrically conducted when a predetermined said rectifier circuit with positive half wave control electrodes of the plurality of said bridge circuits is electrically conducted;

said rectifier circuits with positive half wave control electrodes and said rectifier circuits with negative half wave control electrodes are connected by a plurality of loads provided therebetween; and said loads selected from the plurality of said loads are fed by electric power of said power supply transformer.

2. The heating power supply apparatus according to claim 1, wherein the electric power of said power supply transformer is fed by selecting parallel or series or both with respect to a plurality of said loads selected from the plurality of said loads.

3. The heating power supply apparatus according to claim 2, wherein said load is a negative resistance load, the number of series connections with respect to a plurality of said loads selected from the plurality of said loads is selected, and voltage of said power supply transformer is applied.

4. A heating power supply apparatus according to claim 1, comprising a bridge circuit having a first rectifier circuit with positive half wave control electrodes and a first rectifier circuit with negative half wave control electrodes, and a bridge circuit having a second rectifier circuit with positive half wave control electrodes and a second rectifier circuit with negative half wave control electrodes, each of said bridge circuits being connected to one winding of a power supply transformer, wherein one selected from said first rectifier circuit with negative half wave control electrodes and said second rectifier circuit with negative half wave control electrodes is electrically conducted when said first rectifier circuit with positive half wave control electrodes is electrically conducted;

one selected from said first rectifier circuit with negative half wave control electrodes and said second rectifier circuit with negative half wave control electrodes is electrically conducted when said second rectifier circuit with positive half wave control electrodes is electrically conducted;

said rectifier circuits with positive half wave control electrodes and said rectifier circuits with negative half wave control electrodes are connected by a plurality of loads provided therebetween; and said loads selected from the plurality of said loads are fed by electric power of said power supply transformer.

5. The heating power supply apparatus according to claim 4, wherein the electric power of said power supply transformer is fed by selecting parallel or series or both with respect to a plurality of said loads selected from the plurality of said loads.

6. The heating power supply apparatus according to claim 5, wherein said load is a negative resistance load, the number of series connections with respect to a plurality of said loads selected from the plurality of said loads is selected, and voltage of said power supply transformer is applied.

7. A heating power supply apparatus according to claim 1, comprising a bridge circuit having a first rectifier circuit with positive half wave control electrodes and a first rectifier circuit with negative half wave control electrodes, a bridge circuit having a second rectifier circuit with positive half wave control electrodes and a second rectifier circuit with negative half wave control electrodes, and a bridge circuit having a third rectifier circuit with positive half wave control electrodes and a third rectifier circuit with negative half wave control electrodes, each of said bridge circuits being connected to one winding of a power supply transformer, wherein one selected from said first rectifier circuit with negative half wave control electrodes and said second rectifier circuit with negative half wave control electrodes is electrically conducted when said first rectifier circuit with positive half wave control electrodes is electrically conducted;

one selected from said first rectifier circuit with negative half wave control electrodes and said second rectifier circuit with negative half wave control electrodes is electrically conducted when said second rectifier circuit with positive half wave control electrodes is electrically conducted;

said rectifier circuits with positive half wave control electrodes and said rectifier circuits with negative half wave control electrodes are connected by a plurality of loads provided therebetween;

said loads selected from the plurality of said loads are fed by electric power of said power supply transformer; and said third rectifier circuit with negative half wave control electrodes is electrically conducted when said third rectifier circuit with positive half wave control electrodes is electrically conducted, so that a power feeding direction with respect to said loads is controlled.

8. The heating power supply apparatus according to claim 7, wherein the electric power of said power supply transformer is fed by selecting parallel or series or both with respect to a plurality of said loads selected from the plurality of said loads.

9. The heating power supply apparatus according to claim 8, wherein said load is a negative resistance load, the number of series connections with respect to a plurality of said loads selected from the plurality of said loads is selected, and voltage of said power supply transformer is applied.

10. A heating power supply apparatus comprising:

a plural number of bridge circuits, each having a rectifier circuit with positive half wave control electrodes and a rectifier circuit with negative half wave control electrodes, and each of the plural number of said bridge circuits being connected to one winding of a first power supply transformer; and a plural number of bridge circuits, each having a rectifier circuit with positive half wave control electrodes and a rectifier circuit with negative half wave control electrodes, and each of the plural number of said bridge circuits being connected to one winding of a second power supply transformer, wherein said rectifier circuit with negative half wave control electrodes selected from the plurality of said bridge circuits connected to said first power supply transformer is electrically conducted when a predetermined said rectifier circuit with positive half wave control electrodes of the plurality of said bridge circuits connected to said first power supply transformer is electrically conducted;

said rectifier circuit with negative half wave control electrodes selected from the plurality of said bridge circuits connected to said second power supply transformer is electrically conducted when a predetermined said rectifier circuit with positive half wave control electrodes of the plurality of said bridge circuits connected to said second power supply transformer is electrically conducted;

said rectifier circuits with positive half wave control electrodes and said rectifier circuits with negative half wave control electrodes are connected by a plurality of loads provided therebetween; and the plurality of said loads are fed by electric power of said power supply transformer by selecting the number of series connections of the plurality of said loads.

11. The heating power supply apparatus according to claim 10, wherein said load is a negative resistance load, and the electric power of said power supply transformer is fed by selecting parallel or series or both with respect to the plurality of said loads.

12. A heating power supply apparatus comprising:
a plural number of bridge circuits, each having a rectifier circuit with positive half wave control electrodes and a rectifier circuit with negative half wave control electrodes, and each of the plural number of said bridge circuits being connected to one winding of a first power supply transformer;
a plural number of bridge circuits, each having a rectifier circuit with positive half wave control electrodes and a rectifier circuit with negative half wave control electrodes, and each of the plural number of said bridge circuits being connected to one winding of a second power supply transformer;
a bridge circuit having a rectifier circuit with positive half wave control electrodes and a rectifier circuit with negative half wave control electrodes, said bridge circuit being connected to one winding of a third power supply transformer; and
a bridge circuit having a rectifier circuit with positive half wave control electrodes and a rectifier circuit with negative half wave control electrodes, said bridge circuit being connected to one winding of a fourth power supply transformer,
wherein said rectifier circuit with negative half wave control electrodes selected from the plurality of said bridge circuits connected to said first power supply transformer is electrically conducted when a predetermined said rectifier circuit with positive half wave control electrodes of the plurality of said bridge circuits connected to said first power supply transformer is electrically conducted;
said rectifier circuit with negative half wave control electrodes selected from the plurality of said bridge circuits connected to said second power supply transformer is electrically conducted when a predetermined said rectifier circuit with positive half wave control electrodes of the plurality of said bridge circuits connected to said second power supply transformer is electrically conducted;
said rectifier circuit with negative half wave control electrodes connected to said third power supply transformer is electrically conducted when said rectifier circuit with positive half wave control electrodes connected to said third power supply transformer is electrically conducted;
said rectifier circuit with negative half wave control electrodes connected to said fourth power supply transformer is electrically conducted when said rectifier circuit with positive half wave control electrodes connected to said fourth power supply transformer is electrically conducted;
the rectifier circuits with positive half wave control electrodes and the rectifier circuits with negative half wave control electrodes are connected by a plurality of loads provided therebetween; and
the plurality of said loads are fed by electric power of said power supply transformer by selecting the number of series connections of the plurality of said loads.

13. A heating power supply apparatus comprising:
two sets of bridge circuits, each having a rectifier circuit with positive half wave control electrodes and a rectifier circuit with negative half wave control electrodes, and each of the two sets of said bridge circuits being connected to one winding of a first power supply transformer; and
two sets of bridge circuits, each having a rectifier circuit with positive half wave control electrodes and a rectifier circuit with negative half wave control electrodes, and each of the two sets of said bridge circuits being connected to one winding of a second power supply transformer,
wherein one of said bridge circuits connected to said first power supply transformer and one of said bridge circuits connected to said second power supply transformer are connected in series;
the other of said bridge circuits connected to said first power supply transformer and the other of said bridge circuits connected to said second power supply transformer are connected in parallel by connecting each other's ends of said rectifier circuits with positive half wave control electrodes;
said rectifier circuit with negative half wave control electrodes selected from a plurality of said bridge circuits connected to said first power supply transformer is electrically conducted when a predetermined said rectifier circuit with positive half wave control electrodes of the plurality of said bridge circuits connected to said first power supply transformer is electrically conducted;
said rectifier circuit with negative half wave control electrodes selected from a plurality of said bridge circuits connected to said second power supply transformer is electrically conducted when a predetermined said rectifier circuit with positive half wave control electrodes of the plurality of said bridge circuits connected to said second power supply transformer is electrically conducted;
said rectifier circuits with positive half wave control electrodes and said rectifier circuits with negative half wave control electrodes are connected by a plurality of loads provided therebetween; and
the plurality of said loads are fed by electric power of said power supply transformer by selecting parallel or series or both.

14. A heating power supply apparatus comprising:
two sets of bridge circuits, each having a rectifier circuit with positive half wave control electrodes and a rectifier circuit with negative half wave control electrodes, and each of the two sets of said bridge circuits being connected to one winding of a first power supply transformer;
two sets of bridge circuits, each having a rectifier circuit with positive half wave control electrodes and a rectifier circuit with negative half wave control electrodes, and each of the two sets of said bridge circuits being connected to one winding of a second power supply transformer; and
a bridge circuit having a rectifier circuit with positive half wave control electrodes and a rectifier circuit with negative half wave control electrodes, said bridge circuit being connected to a third power supply transformer, wherein one set of said bridge circuits connected to said first power supply transformer and one set of said bridge circuits connected said second power supply transformer are connected in series;

said rectifier circuit with negative half wave control electrodes selected from a plurality of said bridge circuits connected to said first power supply transformer is electrically conducted when a predetermined said rectifier circuit with positive half wave control electrodes of the plurality of said bridge circuits connected to said first power supply transformer is electrically conducted;

said rectifier circuit with negative half wave control electrodes selected from a plurality of said bridge circuits connected to said second power supply transformer is electrically conducted when a predetermined said rectifier circuit with positive half wave control electrodes of the plurality of said bridge circuits connected to said second power supply transformer is electrically conducted;

said rectifier circuit with negative half wave control electrodes connected to said third power supply transformer is electrically conducted when said rectifier circuit with positive half wave control electrodes connected to said third power supply transformer is electrically conducted;

the rectifier circuit with positive half wave control electrodes and the rectifier circuit with negative half wave control electrodes are connected by a plurality of loads provided therebetween; and the plurality of said loads are fed by electric power of said power supply transformer by selecting parallel or series or both.

* * * * *